(12) United States Patent
Ellis et al.

(10) Patent No.: US 9,671,843 B2
(45) Date of Patent: Jun. 6, 2017

(54) COMPUTER IMPLEMENTED ELECTRICAL ENERGY HUB MANAGEMENT SYSTEM AND METHOD

(75) Inventors: Gordon D. Ellis, Waterloo (CA); Claudio Adrian Canizares, Kitchener (CA); Kankar Bhattacharya, Waterloo (CA); Mohammad Chehreghani Bozchalui, Cupertino, CA (US); Hussin Hassen, Kitchener (CA); Syed Ahsan Hashmi, Pickering (CA)

(73) Assignee: ENERGENT INCORPORATED, Waterloo, ON (CA)

( * ) Notice: Subject to any disclaimer, the term of this patent is extended or adjusted under 35 U.S.C. 154(b) by 463 days.

(21) Appl. No.: 14/008,439

(22) PCT Filed: Mar. 30, 2012

(86) PCT No.: PCT/CA2012/000319
§ 371 (c)(1),
(2), (4) Date: Sep. 27, 2013

(87) PCT Pub. No.: WO2012/129675
PCT Pub. Date: Oct. 4, 2012

(65) Prior Publication Data
US 2014/0018971 A1   Jan. 16, 2014

Related U.S. Application Data

(60) Provisional application No. 61/470,098, filed on Mar. 31, 2011.

(51) Int. Cl.
*G06F 1/26*    (2006.01)
*H02J 13/00*    (2006.01)
(Continued)

(52) U.S. Cl.
CPC ............ *G06F 1/26* (2013.01); *G06Q 10/04* (2013.01); *G06Q 50/06* (2013.01); *H02J 3/14* (2013.01);
(Continued)

(58) Field of Classification Search
CPC   G06F 1/26; G06Q 10/04; G06Q 50/06; H02J 2003/143; H02J 2003/146;
(Continued)

(56) References Cited

U.S. PATENT DOCUMENTS

| | | | | |
|---|---|---|---|---|
| 2003/0171851 A1* | 9/2003 | Brickfield | ............... | H02J 3/008 700/286 |
| 2003/0187550 A1* | 10/2003 | Wilson | ...................... | H02J 3/14 700/295 |
| 2011/0125542 A1* | 5/2011 | Koch | ................ | G06F 17/30976 705/7.16 |

* cited by examiner

*Primary Examiner* — Kenneth M Lo
*Assistant Examiner* — Yuhui R Pan

(57) ABSTRACT

There is disclosed a system, computer program and method provided for enabling an energy hub for improved management and optimization of energy utilization (consumption, production and storage). In an embodiment, a computer-implemented energy hub management system comprises a micro energy hub configured to communicate with two or more energy components at a premises. An energy optimization engine has an energy component model for each energy component based on each energy component's operating characteristics, the energy optimization engine adapted to receive at least one input from the two or more energy components and an input from an external data source on any external energy utilization restrictions for the micro energy hub. In response to at least one input from the two or more energy components and any external energy utilization restrictions on the micro energy hub, the energy optimization engine is adapted to issue one or more control signals (Continued)

to at least one of the energy components at the premises to optimize energy utilization based on one or more optimization criteria.

28 Claims, 10 Drawing Sheets

(51) Int. Cl.
*G06Q 10/04* (2012.01)
*G06Q 50/06* (2012.01)
*H02J 3/14* (2006.01)
*H02J 3/38* (2006.01)

(52) U.S. Cl.
CPC ......... *H02J 3/383* (2013.01); *H02J 2003/143* (2013.01); *H02J 2003/146* (2013.01); *Y02B 70/3225* (2013.01); *Y02B 70/3266* (2013.01); *Y02E 10/563* (2013.01); *Y04S 20/222* (2013.01); *Y04S 20/224* (2013.01); *Y04S 20/242* (2013.01)

(58) Field of Classification Search
CPC ......... H02J 3/14; H02J 3/383; Y02B 70/3225; Y02B 70/3266; Y02E 10/563; Y04S 20/222; Y04S 20/224; Y04S 20/242
USPC .......................................................... 700/297
See application file for complete search history.

COMPUTER IMPLEMENTED ELECTRICAL ENERGY HUB MANAGEMENT SYSTEM AND METHOD

CROSS-REFERENCE TO RELATED APPLICATIONS

This application claims priority from U.S. Provisional Patent Application No. 61/470,098 filed on Mar. 31, 2011.

FIELD OF THE INVENTION

The present invention relates generally to energy management. The present invention relates more specifically to a platform for providing an energy hub that is operable to manage energy usage at a particular premise that comprises a plurality of energy components, including energy consuming components, energy storing components and/or energy producing components.

BACKGROUND OF THE INVENTION

While individual energy efficiency and renewable energy technologies continue to be developed in ever-improving ways, insufficient attention is being paid to the ways in which they can be operated to maximize the benefits across a broader 'energy system'. Significant effort, for example, is being exerted in order to improve the efficiency of photovoltaic cells from, for example, 15% to 18%. What is less recognized, however, is that the value of this same technology could be dramatically increased if it were coupled with an energy storage technology so that, for example, energy captured from the sun at 11 am could be discharged to meet domestic demand at 4 pm, a time at which electricity market prices may be significantly higher that they were just five hours earlier.

There are existing technologies for 'smart building management'. In residential settings, there are systems that serve to automatically control lighting and heating, often dependent upon the time of day and month of year. Moreover, homeowners are able to override the system and/or input their own preferences. Similarly, control systems for commercial/institutional settings have long been used to improve energy performance, for example, motion detectors attached to light fixtures in stairwells and bathrooms. In industrial locations, the fact that energy can be a significant cost to some companies has meant that it is monitored closely and, therefore, industrial customers have traditionally been those first to respond to 'demand response' programs.

What is missing, from the state of the art, is an integrated solution that operates across energy producing and consuming devices, and also operates in consideration of external conditions.

SUMMARY OF THE INVENTION

The present invention provides a system and method for energy management. The energy management system of the present invention is provided by a platform that enables an energy hub and system for dynamic management of the energy hub. The energy hub interfaces with various energy components at a particular premise, such as various energy consuming devices. The system of the present invention includes an energy optimization engine that is operable to generate an energy model that optimizes energy usage of energy consuming components based on energy component models, external and environmental data, previously generated energy models and user preferences.

The energy hub provides bidirectional control of the energy components, including recording energy utilization (consumption/production/storage) data and directing operation of the energy components. Energy components may be energy consuming devices, energy storage devices and/or energy producing devices.

The energy hub includes (1) one or more micro hub layers, each generally corresponding to an energy utilization service location with multiple energy consuming/producing devices, with aggregate control enabled through the micro hub layer, and (2) a macro hub layer linked to two or more micro hub layers, the macro hub layer being linked to a node in an energy grid (usually a particular feeder or sub-station), the macro hub layer being linked to a central core or controller for the grid and being operable to aggregate information regarding local consumption/production conditions associated with its two or more micro hub layers, and enabling dynamic management of energy utilization (consumption/production/storage) for the two or more micro hub layers based on the local consumption/production conditions.

Thus, in an aspect, there is provided a computer-implemented energy hub management system, comprising: a micro energy hub configured to communicate with two or more energy components at a premises; and an energy optimization engine having an energy component model for each energy component based on each energy component's operating characteristics, the energy optimization engine adapted to receive at least one input from the two or more energy components and an input from an external data source on any external energy utilization restrictions for the micro energy hub; whereby, in response to the at least one input from the two or more energy components and any external energy utilization restrictions on the micro energy hub, the energy optimization engine is adapted to issue one or more control signals to at least one of the energy components at the premises to optimize energy utilization based on one or more optimization criteria.

In another aspect, there is provided a computer-implemented method for managing an energy hub, comprising: configuring a micro energy hub to communicate with two or more energy components at a premises; providing an energy optimization engine having an energy component model for each energy component based on each energy component's operating characteristics, the energy optimization engine adapted to receive at least one input from the two or more energy components and an input from an external data source on any external energy utilization restrictions for the micro energy hub; and in response to the at least one input from the two or more energy components and any external energy utilization restrictions on the micro energy hub, issuing one or more control signals from the energy optimization engine to at least one of the energy components at the premises to optimize energy utilization based on one or more optimization criteria.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 1:
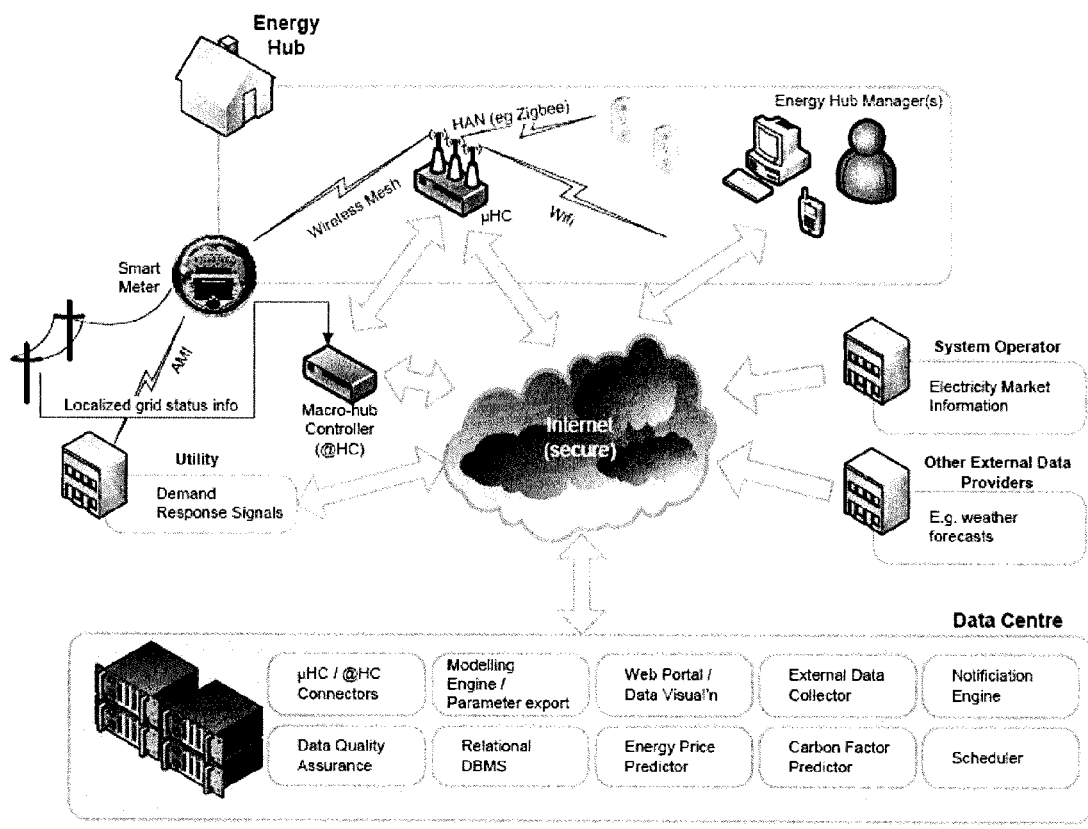
FIG. 1 illustrates a representative system embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

The present invention provides a system and method for energy management. The energy management system of the present invention is provided by a platform that enables an energy hub and system for dynamic management of the energy hub. The energy hub interfaces with various energy components at a particular premise, such as various energy consuming devices. The system of the present invention includes an energy optimization engine that is operable to generate an energy model that optimizes energy usage of energy consuming components based on energy component models, external and environmental data, previously generated energy models and user preferences.

The present invention solves the problem of conservation and demand management (CDM) by modeling energy loads of industrial, commercial and residential users, including by modeling energy components and energy demand, cost and carriers. Thus it is possible to minimize energy consumption, environmental footprint and/or cost, and maximize profits in the case of demand response programs. For example, an industrial consumer that owns a micro-turbine may at certain times during their daily operation decide not to turn the turbine on, as the energy cost differential between electricity and gas might not justify it, even if demand response programs are taken into account. However, if the use of the heat generated by the turbine can supply part of the thermal demand, the present invention may determine that it is optimal to turn on the turbine.

FIG. 1 illustrates a system in accordance with the present invention. An energy hub is linked to an energy optimization engine that is operable to generate an energy model.

The energy hub is further linked to one or more energy components at a particular premise, such as a residence, commercial centre or industrial centre. Energy components models may be provided by a device database linked to the energy hub. Energy component models may be provided by measuring past behaviour of the energy component (heuristics) and/or by predicted information supplied by a manufacturer or reseller.

The energy hub provides bidirectional control of the energy components, including recording energy utilization (consumption/production/storage) data and directing operation of the energy components. Energy components may be energy consuming devices, energy storage devices and/or energy producing devices.

The energy hub may also be linked to an external and environmental data source, which may be located remotely from the premise and accessed by the energy hub by network connection, such as over the Internet. External and environmental data may include local electricity conditions, electricity market prices and weather forecasts.

The energy hub further includes or is linked to a user interface that enables an energy manager (a user) to indicate user preferences that are used to generate the energy model. The user interface may be a web-based user interface accessible by a computer linked by network to the energy hub.

The energy hub may further be linked to one or more smart meters for obtaining energy usage information for the premise or for other locations.

The energy hub is not limited in size and can range from a single household energy system up to an entire city energy system, considered as a single hub. The energy hub of the present invention may be applied in a number of energy utilization sectors including: residential (e.g., single detached houses), commercial and institutional (e.g., retail stores, shopping malls, schools, hospitals), industrial (e.g., paper mills), agricultural (e.g., dairy farms).

In any electric energy system, the customers' objective is to minimize their energy cost, whereas utilities are not only concerned about the cost, but also issues such as load shape, peak load, quality of service, etc.

In accordance with the energy hub of the present invention, as shown in FIG. 1, a two-tier system architecture is provided that in part enables the differentiation of the objectives of customers and the utility. At the lower level, or i.e., micro hub level, the objective is to optimize the energy utilization from the customer's point of view, whereas at the macro hub level, i.e., a group of micro hubs controlled and scheduled together (e.g., a group of detached house micro hubs), the objective is to optimize the energy utilization from the utility point of view.

At the macro hub level, operational decisions are taken for a group of micro hubs which are passed on to each micro hub for the next scheduling horizon. The micro hub implements the received schedule in real-time and monitors the energy utilization and operational status. If for any reason the schedule is not followed, the micro hub may generate a new schedule for the rest of the scheduling horizon.

It should be understood that the macro hub layer is operable to provide co-ordination and control. In some implementations, the macro hub layer may have the authority to enforce specific rules (for example related to energy utilization) in connection with the micro hubs. For example, electric vehicles are gaining in popularity but transformers and other components of the energy grid are designed in a way that if a sufficient number of people sought to charge electric vehicles at the same time the stress on the grid could result in for example transformer burn-out.

It should be understood that micro hubs may be assigned to macro hubs based on power levels, average consumption and other factors. Generally speaking, the macro hub may be implemented on a one per substation or one per feeder basis. Limits may be set to the number of micro hubs associated with each macro hub.

The EHMS is operable to remove some of autonomy of the micro hubs, not just by virtue of the central controller, but by operation of control that is distributed by operation of the present invention between the central controller and for certain local operational matters, the applicable macro hub. For example an optimizer may be implemented to the system, which may be implemented to the macro hub layer and optionally also to the central controller, such that the optimizer function is distributed as between the macro hub layer and the central controller.

In one particular implementation, the optimizer is implemented to the macro hub layer, based on configurations determined for the operator of the overall grid, but the control operations associated with the functioning of the optimizer may be trumped by for example network broadcast messages from the central controller, for example peak demand constraint related broadcast messages. The optimizer is also implemented to the micro hub layer, and in one aspect a hierarchy may be established in the configuration of the system such that the macro hub layer is operable to override operation of the micro hub layer. In one aspect of the system, it is not necessary that the optimizer in the micro hub layer and the optimizer of the macro hub layer be linked, rather it is the micro hub layer that operationally linked to the macro hub layer as described herein.

The localization, or localization in part, of control of energy delivery and consumption, by virtue of the EHMS architecture, incorporating the macro hub layer as described below, provides an effective way to provide smart grid advantages including better utilization of energy resources. The macro hub layer described may be operable to enforce particular optimization rules and thereby provide improved energy management solutions for localized problems that affect or may affect the feeder level of the energy grid. The system described also enables on demand solutions such as payment for premium access to energy resources based for example on tier pricing regime.

Optimization may be implemented by operation of the micro hub controller, but the micro hub controller may dynamically obtain instructions that enable control from a cloud network. It should be understood that whereas optimization could be run on the micro hub controller but it could also be run in the cloud—the controller could dynamically obtain the instructions from a remote computer or remote network such as a cloud computing network linked to the EHMS. Therefore, it should be understood that while the architecture described contemplates the macro hub and micro hub layers, each being operable to enable control functionality, each of these layers may also be linked to further resources in exercising their respective control operations, for example a cloud computer network.

FIG. 1 shows the overall architecture that provides the macro hub and plurality of associated microhubs. The architecture enables the interaction between these hubs by means of the overall Energy Hub Management System (EHMS) described herein, including the data and information exchanges that are facilitated between the hubs.

The EHMS described herein a solution that allows static energy users to effectively manage their energy requirements. More specifically, the EHMS empowers energy hubs—that is, individual locations that require energy (e.g., manufacturing facilities, farms, retail stores, but specifically in this case detached homes) in a way that they can contribute to the development of a sustainable society through the optimal real-time management of their energy demand, production, storage and resulting import or export of energy.

The EHMS may be implemented using the following elements:

Two-way controls on energy consuming and producing devices within the energy hub. In on aspect, these controls may have the capacity both to record, as appropriate, energy utilization (consumption/production/storage) data and to direct the operation of the individual device.

A central core or controller through which the information collected from the energy hub's devices, the external environment (for example, local electricity conditions, electricity market prices and weather forecasts) and the models developed from past device performance are used in user-defined decision-making heuristics in order to manage energy effectively.

Optionally a web-based portal is provided acts as an interface between the energy hub's managers and the central core/device technology. The present invention may be implemented using state-of-the-art wireless communication devices, cloud deployment and various instrumentation and control technologies, and thereby provides an effective, integrative interface amongst energy producing and consuming devices within a single, static location. The web-based portal may be configured and presented in a user-friendly portal for managers of the energy hub for local use or remote use.

Referring to FIG. 1, the following described in greater detail the principle elements of the architecture shown in FIG. 1, which is one possible implementation of the present invention.

Micro-Hub Controller (μHC)

This element is best understood as an embedded computing device (using hardware and software suitable for the applications described, configured in a manner obvious to those skilled in the art), installed within a home (or other particular location), configured to enable one or more of the following (and other operations are possible):

Communicating with the utility smart meter(s), typically via a wireless communications protocol such as an IEEE 802.15.4 variant, to acquire real-time energy utilization, price information schedules, etc.

Acquiring energy utilization data from various "smart" endpoints (e.g. load control devices, smart thermostats, smart appliances, smart breaker panels, local energy sources), typically, but not necessarily, through a wireless communications protocol (e.g. Zigbee HA/SE).

Communicating with Data Centre (see below) bound applications to receive various optimization inputs (e.g. predicted energy price trajectories, kWh related carbon predictions, weather forecasts, historic anal data of a similar nature, device model parameters, and optimization objectives).

Computing an optimal energy hub device optimization schedule subject to energy hub manager defined preferences and optimization objectives, as per the methodology defined herein (this computation may optionally occur on servers at the Data Centre and be delivered securely to the µHC over the public internet)

Automatically and reliably sending requisite control signals to the elements under direct control according to the computed optimal operations schedule, and presenting said schedule to the Energy Hub Manager for discretionary control items i.e. devices for which the energy hub manager has elected not to provide a control endpoint, in multiple forms (e.g. in home display, portable digital assistant (PDA)/smart phone, web portal. This may also include the enablement of alternative generating sources within the energy hub, and/or storage assets.

Locally storing and then forwarding to the Data Centre normalized energy utilization and load profile data for all metered elements within the energy hub.

Receiving co-ordination and control instructions (e.g. additional optimization constraints, operating refinements) from its associated macro-hub controller, should there be one, and forwarding information like projected load profile such that macro-hub level optimizations can also be carried out (e.g. adjusted electric vehicle charger operating schedule).

Macro-Hub Controller (@HC)

A computing device, possibly installed within a residential neighbourhood (or other local energy service area) in close proximity to its electricity distribution system, (using hardware and software suitable for the applications described, configured in a manner obvious to those skilled in the art), configured to enable one or more of the following (and other operations are possible):

Sensing localized grid/distribution system status data e.g. current transformer loading levels, tap changer positions.

Sending control signals to the local distribution system to effect optimal equipment operation.

Secure, bi-directional communications with a set of associated µHC's to ensure their individual micro-hub level optimizations factor local grid conditions.

Data Centre

The system may be linked to a data centre (provided in a manner known to those skilled in the art) for remote logging of relevant information including for example energy utilization data and device status data. The data centre may enable the functionality described below, and include the components described below.

Micro-hub/Macro-hub (µHC/@HC) Connectors: modules capable of secure communications with remotely installed and micro and macro hub controllers, primarily for the purpose of energy utilization data and device status information.

Data Quality Assurance: a software module that ensures the quality of the data sourced from the µHC's e.g. detecting anomalous/erroneous energy data values with optional capability of providing reasonable substitute according to a number of possible substitution algorithms.

Energy Price Predictor a module capable of providing reliable hourly predictions of near-term energy spot prices (e.g. for the coming 24 hours).

Carbon factor Predictor a module capable of generating hourly predictions of near-term hourly carbon factors per kWh based on the predicted generation mix within the jurisdiction.

Modelling Engine/Parameter Export: optimizer related software module capable of serving requests (e.g. via a web service API) from authenticated µHC's to provide user defined and system defined optimization model parameters, constraints and objectives, and possibly computing the optimal operations schedule.

Web Portal/Data Visualization: a set of software modules that provides Energy Hub Managers a secure viewport into their system, possibly from a home computer, their smart phone, etc. to monitor system status, adjust preferences and optimization objectives, set and track "energy budgets/goals", enable over-rides, etc.

External Data Collector a module capable of interfacing with all required external data sources (e.g. the system operator, a weather forecasting service) and storing this information in a central repository available for use by other Data Centre applications.

Notification Engine: a service capable of providing relevant notifications to Energy Hub Managers (e.g. system status changes, availability of new optimal operations schedules) through a variety of configurable notification devices (e.g. e-mail, social networking sites).

Scheduler. a module that facilitates scheduling services for activities like periodic µHC/©HC interactions, optimizer runs, etc.

Figure 2:
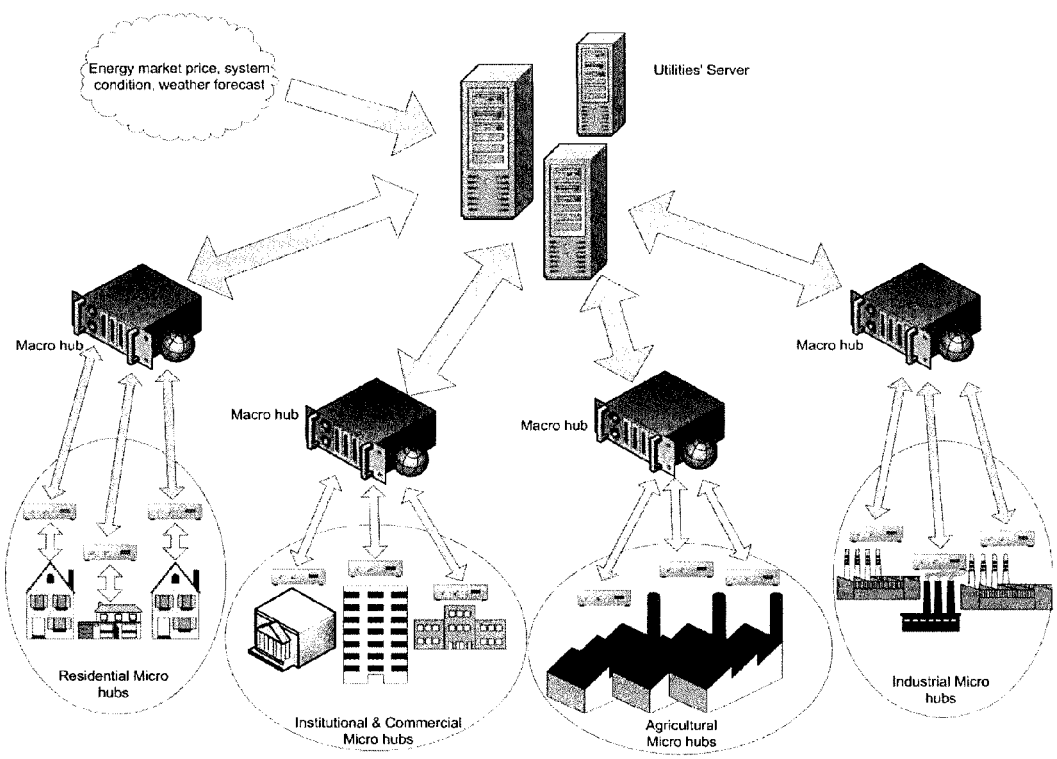
FIG. 2 shows an overall schematic of the Energy Hub Management System (EHMS) of the present invention, in one embodiment thereof.
Figure 3:
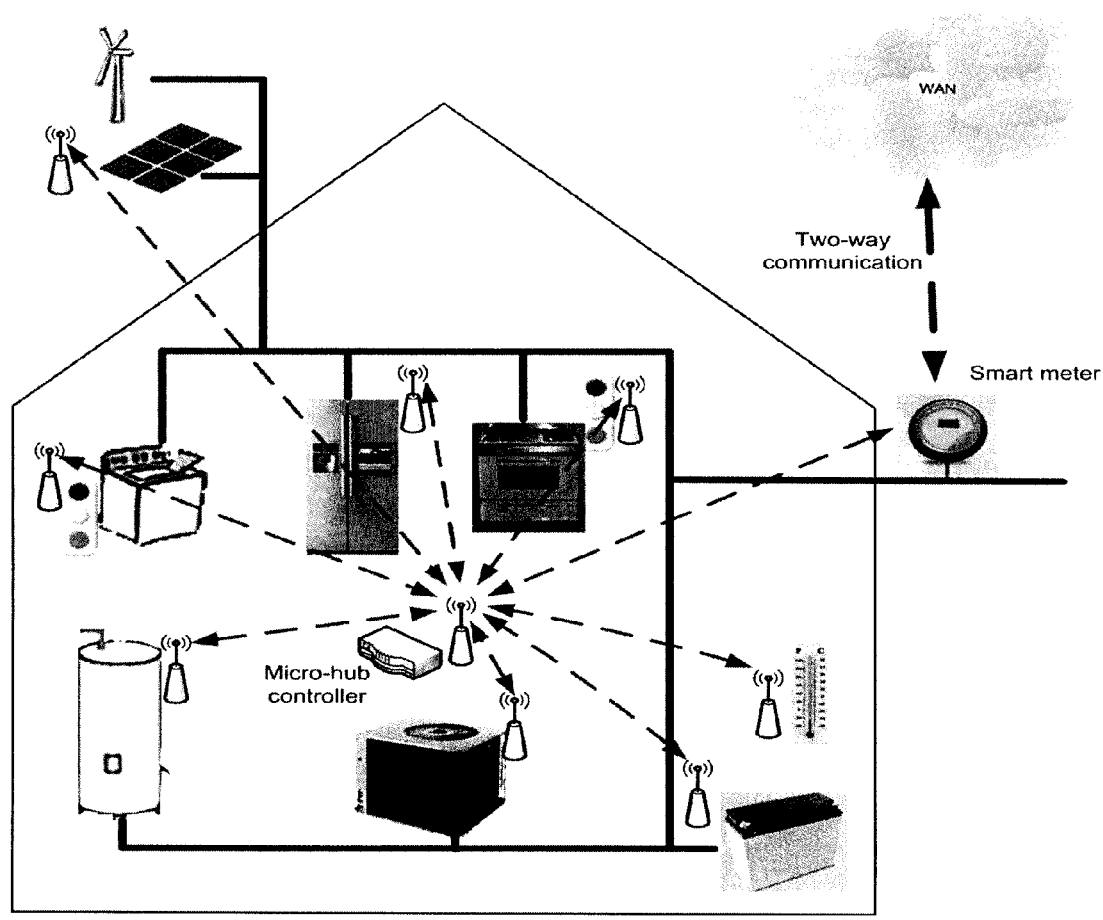
FIG. 3 shows an example of a residential micro hub structure layer of the EHMS.
Figure 4:
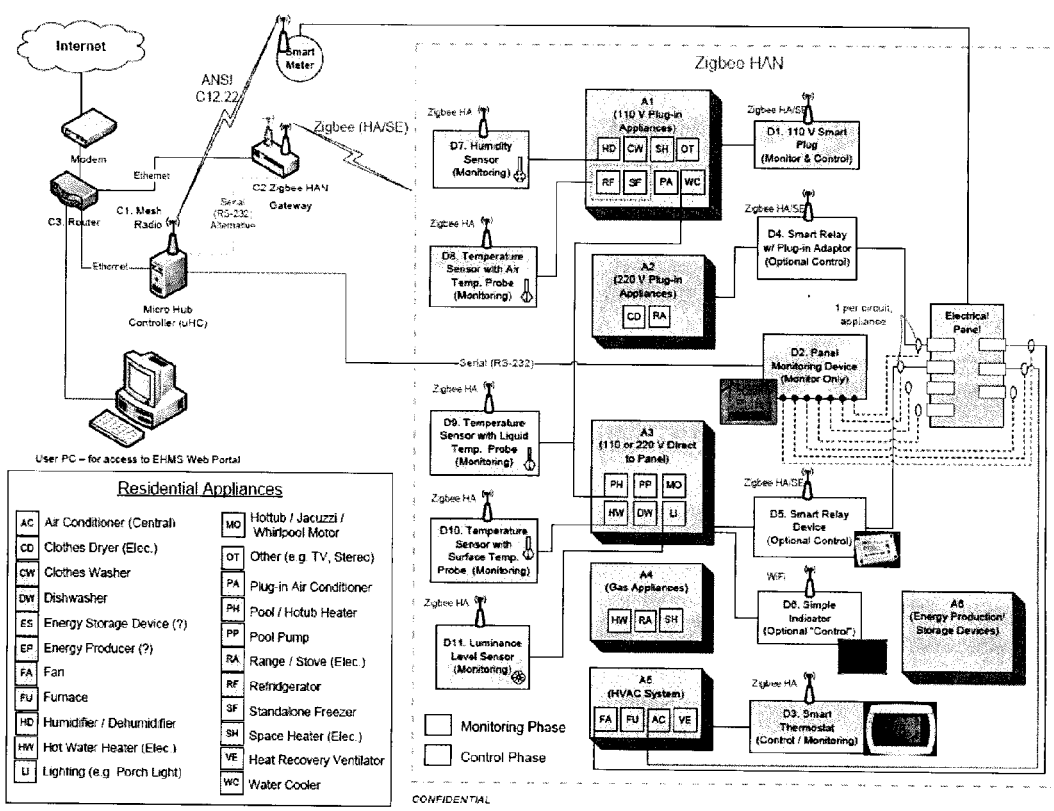
FIG. 4 shows a further implementation of the EHMS in a residential context.

FIG. 2 also shows the three other categories of the macro hubs, namely, commercial and institutional, agricultural, and industrial. In these macro hubs, there may or may not exist multiple micro hubs, but all would have similar arrangements for data and information exchange. As seen in FIG. 3, a typical residential macro hub will comprise several micro hubs which would communicate with the macro hub with regard to their energy usage and control decisions. The micro hubs are at the residential household level and the macro hub can be thought of as a group of residential micro hubs. FIG. 4 also shows a representative residential implementation, also illustrating integration of the system of the present invention with third party devices.

In one aspect of the invention, each micro hub is operable to generate its operational schedule as per one or more models, for example the ones discussed herein. The generated schedules may be communicated to a macro hub linked to the micro hub, and which incorporates this information and system level information to execute a macro-hub level operational model. The outcomes from the macro-hub level will be sent back to the micro hubs which then apply these as outer bounds on constraints of their micro-hub operational model.

The present invention therefore provides a multi-level optimization technology that involves coordination between the sectoral macro hub and the multiple micro hubs within each macro hub. The system infrastructure that includes at least one macro hub and multiple associated micro hubs is operable to embody or implement one or more models for optimal operation of macro hubs for example for the four categories described, and which incorporate a series of optimization operations from both the customer and the utility point of view. The models incorporate a series of rules or processes for determining whether customer driven or utility driven factors shall govern in particular circumstances, within a particular time period.

The macro hub controller is operable to establish a view of local conditions across a plurality of associated micro hub controllers. These conditions include for example local demand and cost saving objectives of local home owners. These conditions are captured and analyzed on a real time or near real time basis. The macro hub is in communication with the operator, and is operable to obtain information regarding pricing and demand objectives of the operator. The macro hub includes functionality that enables the balancing of these consumer and operator objectives based on current local conditions and also current objectives of the operator.

The energy optimization engine generates an energy model based on one or more energy component models, external and environmental data, previously generated energy models and/or user preferences. The energy optimization engine may implement a mixed integer linear programming (MILP) optimization model for optimal operation scheduling of the energy hub. The optimization model can be configured to minimize demand, total cost of electricity, gas or other utilities, emissions and peak load over the scheduling horizon while considering the user preferences. Thus, the MILP optimization model can be configured to optimize energy usage based on electricity usage, gas usage, human comfort factors, greenhouse gas emissions, price, etc.

The scheduling horizon used by the energy optimization engine can vary, for example from a few hours to days, and the selection depends on the type of the energy hub and types of activities which take place in the energy hub. For example, in a residential energy hub the scheduling horizon could be set to 24 hours with 1 hour to a few minutes time intervals. Without any loss of generality, in the present specification a 24 hour scheduling horizon with time intervals of 15 minutes have been used, with the exception of the fridge which is 7.5 minutes due to its thermodynamic characteristics.

The optimization model may be solved using any MILP solver such as GNU Linear Programming Kit (GLPK) freeware solver or commercial solver CPLEX.

An example of an optimization model is provided herein for a typical residential application, including major household demands and energy storage/production system is developed. The developed model incorporates electricity and gas energy carriers, and takes into account human comfort factors and green house emissions. The objective functions of the model and operational constraints associated with the energy components of the energy hub are explained in detail here.

A general form of the optimization model for the residential sector may be as follows:

$$\min J = \text{Objective function} \quad (2.1a)$$

$$\text{s.t.} \sum_{i \in A} P_i S_i(t) \le P^{max}(t) \forall t \in T \quad (2.1b)$$

$$\text{Device } i \text{ operational constraints} \forall i \in A \quad (2.1c)$$

Constraint (2.1b) sets a cap on peak demand of the energy hub at each time interval, and ensures that maximum power consumption at a given time does not exceed a specified value. The peak-power limit in this constraint could be set in such a way that the utility can take the advantage of peak-load reduction from each energy hub during peak-load hours. During off-peak and mid-peak hours of the power system this constraint may be relaxed.

Depending on the user preferences, different objective functions can be adopted to solve the optimization problem. Thus, minimization of the customer's total energy costs, total energy utilization, peak load, emissions and/or any combinations of these over the scheduling horizon may be considered as possible objective functions for the optimization model.

The following objective function for the residential energy hub corresponds to the minimization of the user's total energy costs over the scheduling horizon:

$$J_1 = \sum_{t \in T} \begin{bmatrix} \sum_{\substack{i \in A \\ i \notin \{LI, ESD, PV\}}} C_D(t) P_i S_i(t) + \\ \sum_{z \in LI} C_D(t) P_{LI_z} S_{LI_z}(t) IL_z(t) - \\ \sum_{i \in \{ESD, PV\}} C_S(t) P_i S_i(t) + \\ \sum_{i \in \{H, WH\}} C_G(t) HR_i S_i(t) \end{bmatrix} \quad (2.2)$$

The first two terms in (2.2) represent the cost of electricity consumption, the third term represents the revenue from selling stored/produced electricity to the power grid, and the last term represents the cost of gas consumption.

An objective function for minimization of total energy consumption over the scheduling horizon may be represented as follows:

$$J_2 = \sum_{t \in T} \begin{bmatrix} \sum_{\substack{i \in A \\ i \notin \{LI, ESD, PV\}}} P_i S_i(t) + \\ \sum_{z \in LI} P_{LI_z} S_{LI_z}(t) IL_z(t) - \\ \sum_{i \in \{ESD, PV\}} P_i S_i(t) + \\ \sum_{i \in \{H, WH\}} HR_i S_i(t) \end{bmatrix} \quad (2.3)$$

This minimizes operational hours of all devices and maximizes the operation of energy production/storage devices. In this case, the energy price has no effect on the optimum schedule.

An objective function for minimization of green house emissions may be formulated using the social cost of $CO_2$ at each hour as follows:

$$J_4 = \sum_{t \in T} \begin{bmatrix} \sum_{\substack{i \in A \\ i \notin \{LI, ESD, PV\}}} C_{Em}(t) P_i S_i(t) + \\ \sum_{z \in LI} C_{Em}(t) P_{LI_z} S_{LI_z}(t) IL_z(t) - \\ \sum_{i \in \{ESD, PV\}} C_{Em}(t) P_i S_i(t) \end{bmatrix} \quad (2.4)$$

Here, it is assumed that the electricity injected to the grid by the ESD is emissions free.

An objective function for minimization of peak load can be adopted to reduce the demand of the energy hub as follows:

$$J_3 = \sum_{\substack{i \in A \\ i \notin \{LI, ESD, PV\}}} P_i S_i(t) + \sum_{z \in LI} P_{LI_z} S_{LI_z}(t) IL_z(t) \forall t \in T \quad (2.5)$$

In addition to the aforementioned individual objective functions, any combinations of these objective functions can also be used as the objective function of the optimization model. Thus, appropriately weighted linear sum of the objective functions $J_1$, $J_2$, $J_3$, and $J_4$, can be used as an objective function of the optimization model as follows:

$$J = k_1 J_1 + k_2 J_2 + k_3 J_3 + k_4 J_4 \qquad (2.6)$$

where $k_1$ represents the weight attached to the customer's total energy costs in the objective function; $k_2$ converts the total energy consumption in kWh to cost in $ and specifies its weight; $k_3$ represents the weight of the total emissions costs, and $k_4$ represents the effect of the peak load in $ and its weight in the objective function.

To provide an accurate energy model, each energy component linked to the energy hub is represented by an energy component model. For a typical residential energy hub, three categories of components can be identified: energy consumption, energy storage, and energy production. Each of these components has its own specific behaviour, operational constraints, and settings required to operate appropriately. Recognizing the components' behaviour is very important in order to identify and define the decision variables, and formulate the optimized model constraints. In other words, the energy optimization engine must know what kind of loads (devices) are connected in the energy hub in order to take actions according to the behaviour of the load.

The energy components models optimally give priority to user preferences, and are simple enough for successful implementation and easy interpretation of the results. For example, energy component models in the residential sector may include the following parameters in order to capture most of the aspects of the customer preferences:
  the normal temperature or ambient energy (ambient criteria);
  the maximum temperature deviation that the customer is willing to tolerate (comfort criteria);
  the distribution of the cycle able load; and
  residential thermal loss.

Energy component models should fulfill at least two objectives when evaluating Demand Side Management (DSM) policies: first, they should provide the necessary information to evaluate the benefits of DSM implementation, and second, they should provide some comfort index in order to evaluate every control action from the end-user. Considering the above mentioned aspects, energy component models for major energy components in a residential setting are provided herein.

Furthermore, various dynamic pricing methods may be available to electricity customers in the residential sector, including Fixed Rate Plan (FRP), Time-of-Use (TOU) pricing, and Real-Time Pricing (RTP).

In FRP there is a threshold that defines higher and lower electricity prices for customers. If the total electrical energy consumption per month is less than the threshold, then the customers pay the lower price as a flat rate; if it exceeds the threshold, they pay the higher price for each kilowatt hour. For example, in Ontario the threshold is currently set at 600 kWh per month in the summer and 1000 kWh per month in the winter for residential customers and 750 kWh per month for non-residential customers. The difference in the threshold values recognizes that in the winter, Ontario's customers use more energy for lighting and indoor activities and that some houses use electricity heating.

TOU pricing is the simplest form of dynamic pricing. The main objective of dynamic pricing programs is to encourage the reduction of energy consumption during peak-load hours. In TOU pricing, the electricity price per kWh varies for different times of the day. In Ontario, TOU pricing is currently based on three periods of use of energy:
  on-peak, when demand for electricity is the highest;
  mid-peak, when demand for electricity is moderate; and
  off-peak, when demand for electricity is the lowest.

The classification of On-peak, Mid-peak, amid Off-peak periods vary by season and day of the week.

In RTP, the price varies continuously, directly reflecting the wholesale electricity market price and are posted hourly and/or day-ahead for pro-planning. It provides a direct link between the wholesale and retail energy markets and reflects the changing supply/demand balance of the system, to try to introduce customers price elasticity in the market.

In the residential sector, the occupancy of the house may also have a major effect on energy utilization patterns. Furthermore, energy utilization patterns differ in each house depending on the season, and the day such as weekdays and weekends. To consider the effect of household occupancy on energy utilization patterns, a new index termed as the Activity Level may be defined for electrical appliances. This represents the hourly activity level of a house over the scheduling horizon.

To determine a reasonable value of the Activity Level of a residential sector energy hub, historical data of energy utilization provided by installed smart meters at each house can be used. Smart meters can provide a wealth of data, including energy consumed each hour or even in each fifteen minute interval. Therefore, the measured data of the previous weeks, months, and years can be used to predict the energy utilization on a particular day.

Statistical methods can be used to construct household load profiles on an hourly basis. Similarly, load models may be developed using a linear regression and load patterns approach. The load pattern may be represented as the sum of daily-weekly components, outdoor temperature, and random variations. These load patterns could be modified to obtain the proposed Activity Level of a house on an hourly basis.

It should be noted that the Activity Level index has a different effect on each of the electrical appliances in the house. For example, the effect of the activity level on the fridge temperature is not the same as its effect on the room temperature. Thus, the Activity Level index is related to each of the energy consuming devices with an appropriate coefficient.

During base-load hours of the house, which represents time periods of inactivity inside the house, occupants are either sleeping or outside the house, and therefore the probability of the fridge door being opened is zero. By inspection, the value of this base-load consumption is approximately 50% of the average hourly electrical energy consumption. Therefore, to determine the fridge activity level, $AL_{FR}$, it can be assumed that the base-load consumption is 50% of the average household consumption; thus, any load that is less than the base-load will not contribute to the fridge activity.

Another environmental data item is green house gas emissions. Electric systems in general depend on various generating units which include nuclear, hydro-electric, gas and coal power plants, and some amount of renewable energy resources. Typically, nuclear and large hydro-electric units provide base load generation. Coal and gas-fired generating units, which are responsible for $CO_2$ emissions, generally run during the day and supply a part of the base load, but mostly supply peak load. Coal and gas produce different amounts of $CO_2$ therefore, power generation from coal and gas-fired generating units needs to be known in order to estimate the $CO_2$ emissions from the system.

A power generation forecast may be one of the external data items. The system operators, e.g., the Independent Electricity System Operator (IESO), do not typically provide power generation forecasts for power plants. Therefore, the power generation from coal and gas-fired generating units may need to be forecasted. Rather than considering each individual unit separately, the estimation can be done by considering the aggregate generation from coal-fired plants and from gas-fired plants, separately. These forecasts may be carried out using an econometric time-series model.

External inputs required by the forecasting model may be as follows:

a 24-hour ahead total system demand profile obtained from pre-dispatch data;

hourly total system demand for the past 14 days; and hourly cumulative generation from coal- and gas-fired units for the past 14 days.

The following time-series forecasting model is used to forecast the power generation from coal- and gas-fired power plants in Ontario for example, separately:

$$\hat{Y}_{t,p} = \overline{Y}_{t,p} + B_t(\hat{X}_t - \overline{X}_t) \quad (1.1a)$$
$$\forall t \in \{1, 2, \ldots, 24\}, \forall p \in \{coal, gas\}$$

$$\overline{X}_t = \frac{1}{n}\sum_{j=1}^{n} X_{j,t} \quad (1.1b)$$
$$\forall t \in \{1, 2, \ldots, 24\}, \forall j \in \{1, 2, \ldots, 14\}$$

$$\overline{Y}_{t,p} = \frac{1}{n}\sum_{j=1}^{n} Y_{j,t,p} \quad (1.1c)$$
$$\forall t \in \{1, 2, \ldots, 24\}, \forall j \in \{1, 2, \ldots, 14\},$$
$$\forall p \in \{coal, gas\}$$

$$B_t = \frac{\sum_{j=1}^{n} Y_{j,t}(X_{j,t} - X_{mean})}{\sum_{j=1}^{n} (X_{j,t} - X_{mean})^2} \quad \forall t \in \{1, 2, \ldots, 24\}, \quad (1.1d)$$
$$\forall j \in \{1, 2, \ldots, 14\}, \forall p \in \{coal, gas\}$$

An emissions forecast is another external or environmental data item. Natural gas and coal have different chemical compositions and hence produce different amount of $CO_2$. Natural gas is the least carbon-intensive fossil fuel, and its combustion emits 45% less $CO_2$ than coal. Therefore, separate rates of emissions for gas and coal fired units have been used. The day-ahead emissions profile is calculated as follows:

$$Em(t) = R_c \times P_c(t) + R_g \times P_g(t) \quad \forall t \in \{1,2,\ldots,24\} \quad (1.2)$$

The marginal cost of $CO_2$ emissions per kWh energy generation may be calculated, for optimization purposes, using the Social Cost of Carbon dioxide (SCC) emissions or marginal damage cost of climate change, as follows:

$$C_{Em}(t) = \frac{Em(t) \times SCC}{\hat{X}(t)} \forall t \in \{1, 2, \ldots, 24\} \quad (1.3)$$

Using the forecasted data, a day-ahead emission profile can be calculated.

EXAMPLES

Energy component models of major household devices (appliances), i.e., air-conditioning, heating system, water heater, pool pumps, fridge, dishwasher, washer and dryer, and stove are provided herein. Also, a generic energy component model for energy storage/generation devices, and an energy component model of a photo-voltaic (PV) solar array is provided. These set of energy component models represent the operational constraints of the residential energy hub. The definition of the model variables and sample parameter values are:

| | Description | Example |
|---|---|---|
| Indices | | |
| i | Device (Appliance) | i = FR, i = AC |
| t | Time interval | t = 1, 2, 3, . . . , 96 |
| Sets | | |
| A | Set of devices (appliances) | {FR, AC, H, DW, W} |
| T | Set of indices in the scheduling horizon | T = {1 . . . 96} |
| $T_i$ | $T_i \subseteq T$ is the set of periods in which device i may operate; $T_i = \{t \in T: EOT_i \leq t \leq LOT_i\}$ | $T_{AC} = \{1 \ldots 96\}$ |
| Variables | | |
| $S_i(t)$ | State of device i at time t, binary | On/Off |
| $U_i(t)$ | Binary variable denoting start up of device i at time t: $U_i(t) = \begin{cases} 1 & \text{startup of device i at time t} \\ 0 & \text{Otherwise} \end{cases}$ | 0/1 |
| $D_i(t)$ | Binary variable denoting shut down of device i at time t: $D_i(t) = \begin{cases} 1 & \text{shutdown of device i at time t} \\ 0 & \text{Otherwise} \end{cases}$ | 0/1 |
| $\theta_i(t)$ | Temperature of device i a time t | $\theta_{FR}(t)$ |
| $IL_z(t)$ | Illumination Level of a given zone z in the house at time t | $IL(z, t) \in \{1, \ldots, 6\}$ |
| $ESL_i(t)$ | Energy Storage Level of device i at t | $ESL_{ESD}(t)$ |

| Description | Example |
|---|---|
| Parameters | |
| $C_D(t)$ Price of electricity demand at time t | TOU electricity price |
| $C_S(t)$ Price of electricity supply at time t | Fixed electricity price (80 cents/kWh) |
| $C_G(t)$ Price of gas demand at time t | Fixed gas rate (25 cents/m³) |
| $C_{Em}(t)$ Marginal cost of emissions at time t | 7 cents/kWh |
| $P^{max}(t)$ Maximum allowed peak load of the energy hub at time t | 10 kW |
| $P_i$ Rated power of device i | $P_{FR}$ = 350 W |
| $EOT_i$ Earliest Operation Time of device i | $EOT_{FR}$ = 1 |
| $LOT_i$ Latest Operation Time of device i | $LOT_{FR}$ = 96 |
| $MUT_i$ Minimum Up Time of device i | $MUT_{FR}$ = 2 (2 time intervals) |
| $MDT_i$ Minimum Down Time of device i | $MUT_{FR}$ = 2 (2 time intervals) |
| $MSOT_i$ Maximum Successive Operation Time of device i | $MSOT_{Stv}$ = 3 |
| $AL(t)$ Activity Level at time t | Figure 1.3 |
| $AL_{FR}(t)$ Activity Level of fridge at time t | Figure 1.4 |
| $HWU(t)$ Average hourly Hot Water Usage at time t | Figure 2.1 |
| $HR_i$ Heat Rate of of device i | $HR_{WH}$ = 3m³ per time interval |
| $\theta_i^{up}$ Upper limit of temperature of device i | $\theta_{FR}^{up}$ = 4° C. |
| $\theta_i^{low}$ Lower limit of temperature of device i | $\theta_{FR}^{low}$ = 1.5° C. |
| $IL_{z_{min}}(t)$ Minimum required zonal illumination at time t | Figure 2.3 |
| $IL_{z_{out}}(t)$ Outdoor illumination level of a given zone in the house at time t | Figure 2.4 |
| $ESL_i^{min}$ Minimum Energy Storage Level of device i | $ESL_{ESD}^{min}$ = 250 Wh |
| $ESL_i^{max}$ Maximum Energy Storage Level of device i | $ESL_{ESD}^{max}$ = 3000 Wh |
| $CH_i(t)$ Charged energy into device i at time interval t | $CH_{PV}(t)$ |
| $DCH_i$ Discharged energy from device i during one time interval | $DCH_{ESD}$ = 100 Wh |
| LPN Large Positive Number | LPN = 1000 |

Fridge

In order to model the operational aspects of a fridge for scheduling purposes, both the variable under control and operational constraints of the fridge should be considered. The developed model should be able to maintain the fridge temperature within a specified range, while taking into account technical aspects of the fridge operation as well as the customer preferences. The operational constraints of the fridge in the optimization model are as follows:

$$S_i(t) = \begin{cases} 0 \text{ or } 1 & \text{if } t \in T_i, i = FR \\ 0 & \text{if } t \notin T_i, i = FR \end{cases} \quad (2.7a)$$

$$S_i(t=1) = \begin{cases} 1 & \text{if } \theta_{FR}(t=0) > \theta_{FR}^{up} \\ 0 & \text{if } \theta_{FR}(t=0) < \theta_{FR}^{low} \end{cases} \quad (2.7b)$$

$$\theta_{FR}^{low} \leq \theta_{FR}(t) \leq \theta_{FR}^{up} \forall t \in T_i, i = FR \quad (2.7c)$$

$$\theta_{FR}(t) = \theta_{FR}(t-1) + \beta_{FR} AL_{FR}(t) - \alpha_{FR} S_i(t) + \gamma_{FR} \quad (2.7d)$$
$$\forall t \in T, i = FR$$

The time period over which the fridge can be in operation is specified by (2.7a), where the customer defines the EOT amid the LOP of the fridge. Equation (2.7b) ensures that if the fridge temperature at t=0 is more than the upper limit, as specified by the customer, the fridge state is On in the first time interval. Constraint (2.7c) ensures that the fridge temperature is within the customer's preferred range.

Equation (2.7d) relates the temperature of fridge at time t to the temperature of fridge at time t−1, activity level of the fridge at time t, and On/Off state of the fridge at time t. The effect of the activity level on fridge temperature is modeled using $\beta_{FR}$ so that as the household activity level increases, the temperature increases. In other words, more activity in the house results in more cooling demands for the fridge.

The effect of the On state of the fridge on fridge temperature reduction is represented by $\alpha_{FR}$, and the warming effect of the Off state of the fridge is modeled by $\gamma_{FR}$. The latter is to address the thermal leakage because of difference in temperatures of the fridge and the kitchen. The parameters $\beta_{FR}$, $\alpha_{FR}$, and $\gamma_{FR}$ can be measured or estimated from simple performance tests. The same model with different coefficients and parameter settings can be used to model the freezer in a household.

Air Conditioning (AC) and Heating

Operational constraints developed for modeling of the heating system in a house are similar to the operational constraints of the AC. Therefore, the AC and heating system constraints are presented using a common set of equations, as follows:

$$S_i(t) = \begin{cases} 0 \text{ or } 1 & \text{if } t \in T_i, i = AC/H \\ 0 & \text{if } t \notin T_i, i = AC/H \end{cases} \quad (2.8a)$$

$$S_i(t=1) = \begin{cases} 1 & \text{if } \theta_{in}(t=0) > \theta_{in}^{up}, i = AC \\ 0 & \text{if } \theta_{in}(t=0) < \theta_{in}^{low}, i = AC \end{cases} \quad (2.8b)$$

$$S_i(t=1) = \begin{cases} 1 & \text{if } \theta_{in}(t=0) > \theta_{in}^{up}, i = H \\ 0 & \text{if } \theta_{in}(t=0) < \theta_{in}^{low}, i = H \end{cases} \quad (2.8c)$$

$$\theta_{in}^{low} \leq \theta_{in}(t) \leq \theta_{in}^{up} \quad (2.8d)$$
$$\forall t \in T_i, i = AC/H$$

$$\theta_{in}(t) = \theta_{in}(t-1) + \beta_{AC} AL(t) - \alpha_{AC} S_i(t) + \gamma_{AC}(\theta_{out}(t) - \theta_{in}(t)) \quad (2.8e)$$
$$\forall t \in T, i = AC$$

$$\theta_{in}(t) = \theta_{in}(t-1) + \beta_H AL(t) + \alpha_H S_i(t) - \gamma_H(\theta_{in}(t) - \theta_{Out}(t)) \quad (2.8f)$$
$$\forall t \in T, i = H$$

In the proposed operational model, the time period over which the AC (or the heating system) can be in operation is specified by (2.8a), which is specified by the customer's EOT, and LOP, settings. Equation (2.8b) ensures that if the indoor temperature at t=0 is more than the upper limit, as specified by the customer, the AC state is On in the first time interval, and (2.8c) ensures that if the indoor temperature at t=0 is less than customer defined lower limit, the heating system state is On in the first time interval. Constraint (2.8d) is included in the model to maintain the indoor temperature within the customer preferred range.

Equations (2.8e) and (2.8f) represent the dynamics of indoor temperature for time AC and the heating system, respectively In these equations, $\theta_{Out}(t)$ is the forecasted outdoor temperature at time interval t of the scheduling horizon. These equations state that the indoor temperature at time t is a function of the indoor temperature at time t−1, household activity level at time t, On/Off state of the AC (H) at time t, and the outdoor and indoor temperature difference. The effect of the activity level on indoor temperature increase is modeled by $\beta_{AC}$ ($\beta_H$). Also, $\mu_{AC}$ ($\mu_H$) represents the effect of outdoor and indoor temperature difference on indoor temperature.

The cooling and warming effect of an On/Off state of the AC (the heating system) on indoor temperature are represented by $\alpha_{AC}$ and $\gamma_{AC}$ ($\alpha_H$ and $\gamma_H$), respectively. The developed model captures the normal temperature (ambient criterion), and time maximum temperature deviation that time customer is willing to tolerate (comfort criterion).

Water Heater

An average hourly hot water usage pattern, which is available in the prior art, can be considered for each individual house. There is a larger and earlier spike on weekdays' consumption patterns, whereas the spike occurs later and is significantly flatter on weekends.

The operational constraints of the water heater are represented by:

$$S_i(t) = \begin{cases} 0 \text{ or } 1 & \text{if } t \in T_i, i = WH \\ 0 & \text{if } t \notin T_i, i = WH \end{cases} \quad (2.9a)$$

$$S_i(t=1) = \begin{cases} 1 & \text{if } \theta_{WH}(t=0) < \theta_{WH}^{low} \\ 0 & \text{if } \theta_{WH}(t=0) > \theta_{WH}^{up} \end{cases} \quad (2.9b)$$

$$\theta_{WH}^{low} \leq \theta_{WH}(t) \leq \theta_{WH}^{up} \forall t \in T_i, i = WH \quad (2.9c)$$

$$\theta_{WH}(t) = \theta_{WH}(t-1) - \beta_{WH}HWU(t) + \alpha_{WH}S_i(t) - \gamma_{WH} \quad (2.9d)$$
$$\forall t \in T, i = WH$$

The basic operational constraints of the water heater are similar to those of the fridge and AC model, and are given by (2.9a)-(2.9c). Constraint (2.9d) assumes that the dynamic relation of the water heater temperature at a given time interval t is a function of the water temperature at the previous time interval, the average hot water usage, and the On/Off state of the water heater at time interval t.

Hot Tub Water Heater

The operational constraints of the water heater can also be used for a hot tub water heater. The only difference between these models is in their parameter settings such as average hot water usage, temperature settings, operational time, and associated coefficients that may have different values.

$$S_i(t) = \begin{cases} 0 \text{ or } 1 & \text{if } t \in T_i, i = TWH \\ 0 & \text{if } t \notin T_i, i = TWH \end{cases} \quad (2.10a)$$

$$S_i(t=1) = \begin{cases} 1 & \text{if } \theta_{TWH}(t=0) < \theta_{TWH}^{low} \\ 0 & \text{if } \theta_{TWH}(t=0) > \theta_{TWH}^{up} \end{cases} \quad (2.10b)$$

$$\theta_{TWH}^{low} \leq \theta_{TWH}(t) \leq \theta_{TWH}^{up} \quad (2.10c)$$
$$\forall t \in T_i, i = TWH$$

$$\theta_{TWH}(t) = \theta_{TWH}(t-1) - \beta_{TWH}HWU(t) + \alpha_{TWH}S_i(t) - \gamma_{TWH} \quad (2.10d)$$
$$\forall t \in T, i = TWH$$

Dishwasher

The proposed operational model for the dishwasher is as follows:

$$S_i(t) = \begin{cases} 0 \text{ or } 1 & \text{if } t \in T_i, i = DW \\ 0 & \text{if } t \notin T_i, i = DW \end{cases} \quad (2.11a)$$

$$U_i(t) - D_i(t) = S_i(t) - S_i(t-1) \forall t \in T, i = DW \quad (2.11b)$$

$$U_i(t) + D_i(t) \leq 1 \forall t \in T_i, i = DW \quad (2.11c)$$

$$\sum_{t \in T_i} S_i(k) = ROT_i \forall t \in T_i, i = DW \quad (2.11d)$$

$$\sum_{k=t}^{t+MUT_i} S_i(k) \geq MUT_i - LPN(1 - U_i(t)) \forall t \in T_i, i = DW \quad (2.11e)$$

$$\sum_{k=t}^{t+MSOT_i} S_i(k) \leq MSOT_i + LPN(1 - U_i(t)) \forall t \in T_i, i = DW \quad (2.11f)$$

In this model, the time period over which the dishwasher can be in operation, which is specified by the customer's EOT and LOP settings, is specified by (2.11a). The required operation time, minimum up time, and maximum successive operation time of the dishwasher are parameter settings specified by the end-user, and are modeled by (2.11d) to (2.11f), respectively.

Washer and Dryer

The proposed operational models for washer and dryer are similar to the proposed model of dishwasher. The set of constraints for the washer and dryer is as follows:

$$S_i(t) = \begin{cases} 0 \text{ or } 1 & \text{if } t \in T_i, i = \{W, DRY\} \\ 0 & \text{if } t \notin T_i, i = \{W, DRY\} \end{cases} \quad (2.12a)$$

$$U_i(t) - D_i(t) = S_i(t) - S_i(t-1) \forall t \in T_i, i = \{W, DRY\} \quad (2.12b)$$

$$U_i(t) + D_i(t) \leq 1 \forall t \in T_i, i = \{W, DRY\} \quad (2.12c)$$

$$\sum_{t \in T_i} S_i(k) = ROT_i \forall t \in T_i, i = \{W, DRY\} \quad (2.12d)$$

$$\sum_{k=t}^{t+MUT_i} S_i(k) \geq MUT_i - LPN(1 - U_i(t)) \forall t \in T_i, \quad (2.12e)$$
$$i = \{W, DRY\}$$

$$\sum_{k=t-1}^{t+MUT_i} S_i(k) \leq MSOT_i + LPN(1 - U_i(t)) \forall t \in T_i, \quad (2.12f)$$
$$i = \{W, DRY\}$$

In this model, the time period over which the washer and dryer can be in operation, which is specified by the customer's EOT and LOP settings, is specified by (2.12a). The required operation time, minimum up time, and maximum successive operation time of the washer and dryer are parameter settings specified by the end-user, and are modeled by (2.12d) to (2.12f), respectively.

Usually, the dryer operates after the washer and completes its operation, but a large time gap between the operation of the two appliances is not acceptable. For example, customers most probably would not accept an operation schedule that runs the washer in the morning and the dryer in the afternoon, 12 hours later. Therefore, operation of time washer and the dryer needs to be coordinated. Time following set of constraints coordinate the operation of time two appliances:

$$S_{DRY}(t) \leq \sum_{k=1}^{MATGap} S_W(t-k) \forall \, t \in T \quad (2.13a)$$

$$S_{DRY}(t) + S_W(t) \leq 1 \forall \, t \in T \quad (2.13b)$$

$$\sum_{t \in T_{DRY}} S_{DRY}(t) = \sum_{t \in T_W} S_W(t) \quad (2.13c)$$

where MATGap stands for the maximum allowed time gap between the operation of the washer and time dryer.

Stove

The operation of the stove depends on the household habits and hence direct control of the stove in not reasonable. Therefore, it is proposed to advise the customer on the "preferred" operation times of the stove. The proposed operational model of the stove is as follows:

$$S_i(t) = \begin{cases} 0 \text{ or } 1 & \text{if } t \in T_i, i = Stv \\ 0 & \text{if } t \notin T_i, i = Stv \end{cases} \quad (2.14a)$$

$$U_i(t) - D_i(t) = S_i(t) - S_i(t-1) \forall \, t \in T_i, i = Stv \quad (2.14b)$$

$$U_i(t) + D_i(t) \leq 1 \forall \, t \in T_i, i = Stv \quad (2.14c)$$

$$\sum_{t \in T_i} S_i(k) = ROT_i \forall \, t \in T_i, i = Stv \quad (2.14d)$$

$$\sum_{k=t}^{t+MUT_i} S_i(k) \geq MUT_i - LPN(1 - U_i(t)) \forall \, t \in T, i = Stv \quad (2.14e)$$

$$\sum_{k=t}^{t+MSOT_i} S_i(k) \leq MSOT_i + LPN(1 - U_i(t)) \forall \, t \in T_i, i = Stv \quad (2.14f)$$

In this model, the required operation time, minimum up time, and maximum successive operation time of the stove are parameter settings specified by the end-user, and are modeled by (2.14d), (2.14e) and (2.14f), respectively.

Pool Pump

Pool pumps are in use to maintain the quality of water in swimming pools by circulating the water through the filtering and chemical treatment systems. Therefore, by operating the pool pump for particular hours a day, the pumping system keeps the water relatively clean, and free of bacteria. The operational model of the pool pump is as follows:

$$S_i(t) = \begin{cases} 0 \text{ or } 1 & \text{if } t \in T_i, i = Ppump \\ 0 & \text{if } t \notin T_i, i = Ppump \end{cases} \quad (2.15a)$$

$$\sum_{t \in T_i} S_i(k) = ROT_{Ppump} \forall \, t \in T_i, i = Ppump \quad (2.15b)$$

$$U_i(t) - D_i(t) = S_i(t) - S_i(t-1) \forall \, t \in T_i, i = Ppump \quad (2.15c)$$

$$U_i(t) + D_i(t) \leq 1 \forall \, t \in T_i, i = Ppump \quad (2.15d)$$

$$\sum_{k=t}^{t+MUT_i} S_i(k) \geq MUT_i - LPN(1 - U_i(t)) \quad (2.15e)$$

$$\forall \, t \in T_i, i = Ppump$$

$$\sum_{k=t}^{t+MSOT_i-1} S_i(k) \leq LPN(1 - D_i(t)) \forall \, t \in T_i, i = Ppump \quad (2.15f)$$

$$\sum_{k=t}^{t+MSOT_i} S_i(k) \leq MSOT_i + LPN(1 - U_i(t)) \quad (2.15g)$$

$$\forall \, t \in T_i, i = Ppump$$

Constraint (2.15b) ensures that the pool pump operates for the required operation time over the scheduling horizon, and constraints (2.15e) and (2.15f) model the minimum up-time and down-time requirements of the pool pump. To have effective water circulation, it is important to distribute the water circulation periods within the scheduling horizon; therefore, (2.15g) ensures that the maximum number of successive operation time intervals of the pool pump is not more than a pro-set value.

Energy Storage Device

A modern household is expected to be equipped with some form of Energy Storage/production Device (ESD), such as batteries, electric vehicles, and solar panels. To develop the model of the ESD for a residential micro hub, it is assumed that the amount of energy charged into the ESD at each time interval is known. The generic model of the ESD is given by:

$$S_i(t) = \begin{cases} 0 \text{ or } 1 & \text{if } t \in T_i, i = ESD \\ 0 & \text{if } t \notin T_i, i = ESD \end{cases} \quad (2.16a)$$

$$ESL_{ESD}(t) = ESL_{ESD}(t-1) - S_i(t)DCH_{ESD} + CH_{ESD}(t) \quad (2.16b)$$

$$\forall \, t \in T_i, i = ESD$$

$$ESL_{ESD}(t) \geq ESL_{ESD}^{min} \forall \, t \in T_i, i = ESD \quad (2.16c)$$

$$U_i(t) - D_i(t) = S_i(t) - S_i(t-1) \forall \, t \in T_i, i = ESD \quad (2.16d)$$

$$U_i(t) + D_i(t) \leq 1 \forall \, t \in T_i, i = ESD \quad (2.16e)$$

$$\sum_{k=t}^{t+MUT_i} S_i(k) \geq MUT_i - LPN(1 - U_i(t)) \quad (2.16f)$$

$$\forall \, t \in T_i, i = ESD$$

$$\sum_{k=t}^{t+MDT_i-1} S_i(k) \leq LPN(1 - D_i(t)) \quad (2.16g)$$

$$\forall \, t \in T_i, i = ESD$$

Constraint (2.16b) relates the energy storage level of the ESD at time interval t to that at time t−1, and the energy charge and discharge at time interval t. Constraint (2.16c) ensures that the energy storage level is never less than a specified minimum value. The minimum up-time and down-time requirements of the ESD are modeled by (2.16d)-(2.16g).

PV Array

Figure 5:
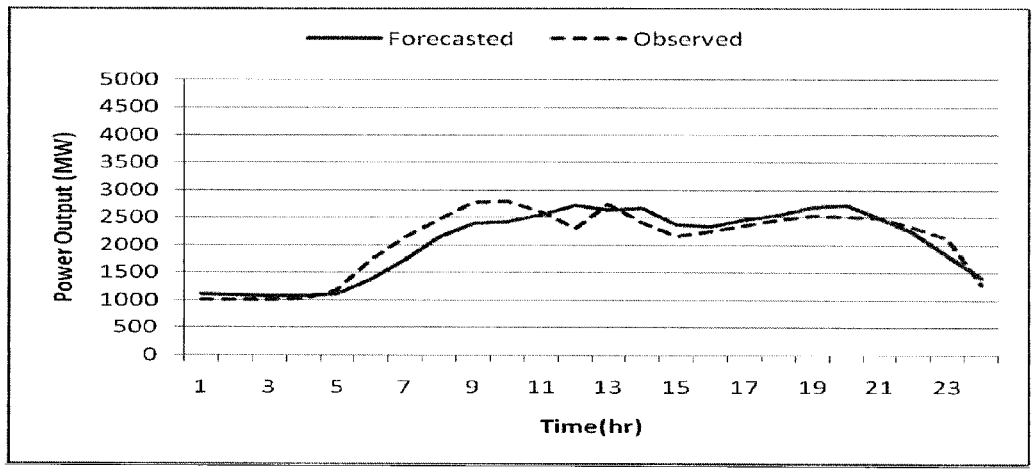
FIG. 5 shows an illustrative comparison of forecasted and actual power generation from gas fired plants on a winter weekday.
Figure 6:
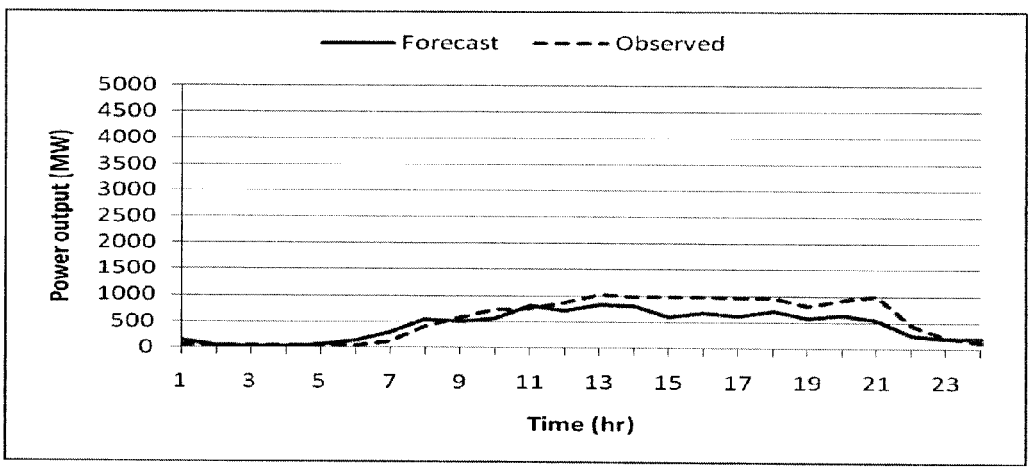
FIG. 6 shows an illustrative comparison of forecasted and actual power generation from coal fired plants on a summer weekday.
Figure 7:
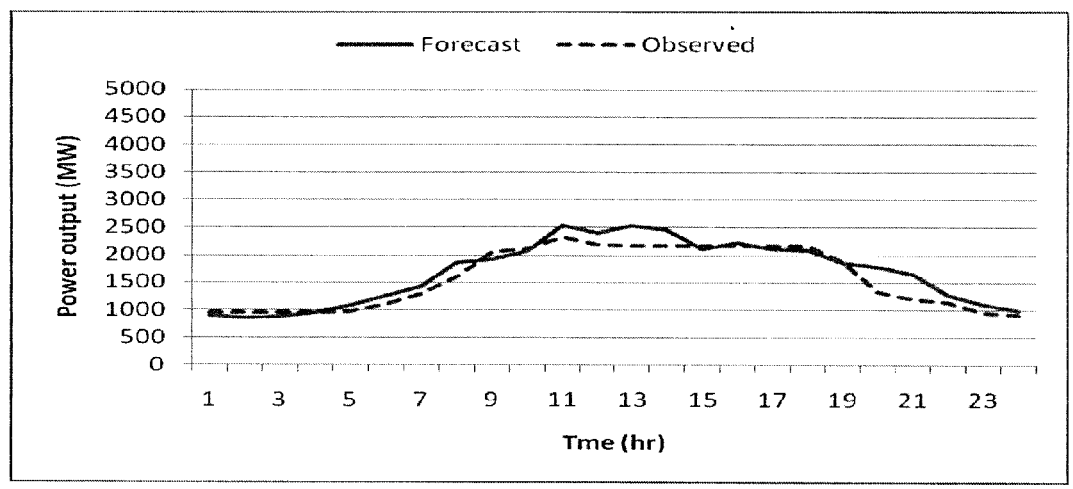
FIG. 7 shows an illustrative comparison of forecasted and actual power generation from gas fired plants on a summer weekday.
Figure 8:
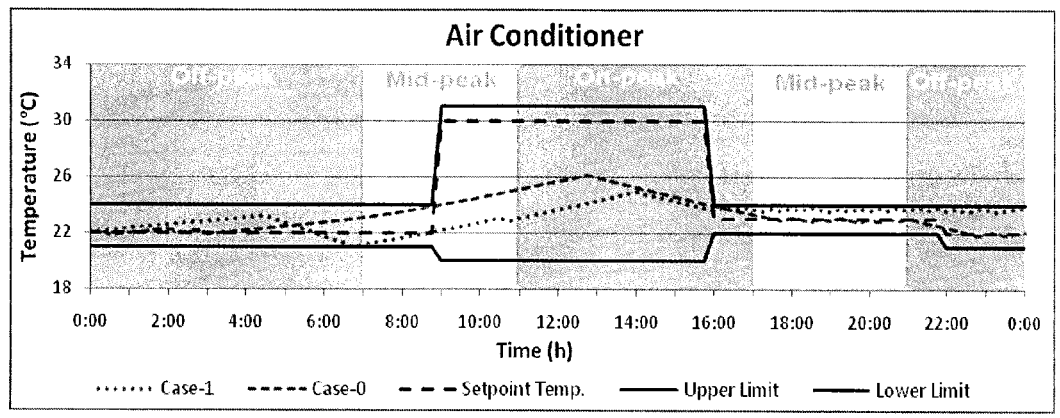
FIG. 8 shows an illustrative comparison of indoor temperatures of Case 0 and Case 1.

FIG. 5 shows one possible way to connect a domestic PV electric power system to the grid. The DC/DC converter can be in two operational modes: the converter mode to charge the battery with a limited power as recommended by the battery manufacturer, and the inverter mode to discharge the battery-stored energy back to the system. The discharge power rating is determined by the DC/DC converter power rating. The AC power generated by the DC/AC inverter is consumed by the house appliances or injected to the utility grid in case of low house electric demand.

The mathematical model of the PV system is as follows:

$$S_i(t) = \begin{cases} 0 \text{ or } 1 & \text{if } t \in T_i, i = PV \\ 0 & \text{if } t \notin T_i, i = PV \end{cases} \quad (2.17a)$$

$$CH_{PV}(t) = \begin{cases} P_{CH} & \text{if } P_{PV}(t) \geq PCH \\ P_{PV} & \text{if } P_{PV} \leq P_{CH} \end{cases} \quad (2.17b)$$

$$ESL_{PV}(t) = ESL_{PV}(t-1) - S_{DCH}(t)DCH_{PV} + S_{CH}(t)CH_{PV}(t) \quad (2.17c)$$
$$\forall t \in T, i = PV$$

$$ESL_{PV}^{min} \leq ESL_{PV}(t) \leq ESL_{PV}^{max} \forall t \in T_i, i = PV \quad (2.17d)$$

$$S_{DCH}(t) + S_{CH}(t) \leq 1 \forall t \in T, i = PV \quad (2.17e)$$

$$(2.17f)$$

Constraint (2.17b) simulates the constant current battery charger operation which is normally used to charge the PV systems batteries. For simplicity, it may be assumed that the battery voltage is constant during the discharging/charging operations; thus, a constant current battery charging is assumed to be a constant power charging process. Constraint (2.17c) shows the effect of the charge/discharge decisions on the battery storage level. Constraint (2.17d) is used to protect the battery against deep discharging and over charging, and equation (2.17e) reflects the fact that the DC/DC converter does not operate in charge and discharge mode simultaneously in thus particular configuration; however, thus constraint can be ignored if separate charging and discharging units are used. It may be assumed in the PV model that the DC/AC and DC/DC conversion efficiency is 100%.

Lighting

The lighting load of a house depends on the activity level and/or the house occupancy and it is modeled using the illumination level concept in the house. It is assumed that the lighting load of the house can be divided into several zones and the minimum required illumination can be provided through the lighting system and outdoor illumination (sunshine). Time following constraints represent time lighting load of a zone z in the house:

$$S_{i_z}(t) = \begin{cases} 0 \text{ or } 1 & \text{if } t \in T_i, i = LI \\ 0 & \text{if } t \notin T_i, i = LI \end{cases} \quad (2.18a)$$

$$IL_z(t) + IL_{z_{out}}(t) \geq (1 + K_t)IL_{z_{min}}(t) \forall t \in T_i \quad (2.18b)$$

$$K_t = -0.2083C_t + 1.833 \forall t \in T_i \quad (2.18c)$$

where IL(t) is the illumination level produced by the lighting system of the house in a particular zone. It is assumed that each illumination level is equal to 100 lx, and 150 W is required to produce 100 lx illumination. Constraint (2.18b) ensures that the total zonal illumination (from the lighting system and outdoor sunshine) is more than a minimum required level. The price elasticity of the lighting load is modeled using (2.18c), where $K_t$, $0 \leq K_t \leq 1$, is the elasticity parameter. Thus, during peak hours, $K_t$ is equal to 0, which means the householder uses the minimum required illumination; while during off-peak hours $K_t$ is equal to 1, which means the householder consumes more lighting than the minimum required illumination.

The minimum required zonal illumination and outdoor illumination at time interval t are assumed to be exogenous inputs to the model. The effect of the house occupancy on the lighting load is considered in the minimum required illumination level for each zone.

The benefit provided by the energy optimization engine using the energy hub of the present invention can be verified using these energy component models for a plurality of example test case studies.

In these case studies, the energy optimization engine is run for a typical residential customer, where parameters and device ratings are suitably chosen, and realistic data inputs for outside temperatures, illumination levels, and solar PV panel generation have been used. TOU, RTP, and FRP pricing for electricity, and fixed rate price for natural gas are used to calculate the total energy costs.

The following case studies illustrate the capabilities and performance of the present invention:

Case-0, the base case, maximizing customer's comfort, where the summation of the temperature deviations from the set points is minimized, while all other user defined constraints on operation of the devices are met;

Case-1, minimization of energy costs, where optimum operational schedules to minimize total cost of energy from all devices is provided;

Case-2, minimization of energy consumption, where optimum operational schedules to minimize total energy consumption from all devices is provided;

Case-3, minimization of emissions, wherein the optimum schedule for all devices are generated to minimize $CO_2$ emissions, using an Ontario emissions profile;

Case-4, minimization of energy costs subject to peak power constraints, where minimization of the total energy costs with a peak power cap on electricity consumption at each time interval is provided; and Case-5, minimizing total energy costs, consumption and emissions, where individual objective functions of minimizing total energy costs, energy consumption and emissions are assigned weights to form an objective function to minimize all of them at the same time.

In order for the energy optimization engine to provide the optimized model for each case, it is important to select appropriate model parameters which are close to those in the real world. For practical systems, most of these parameters would be developed by proper estimation, appliance performance tests and customer preferences. For the cases herein, the assumed parameter settings are given in the third column of Table 1, below.

TABLE 1

| Device | Name plate rating | Average power used |
|---|---|---|
| Air conditioner | 3.2 kW | Running wattage = 2.2 kW |
| Furnace | 75.5 kBtu/hr, 1150 W | Gas consumption rate = 2.136 m³/hr Electricty consumption = 1.15 kW |
| Fridge | 0.9 kVA | 0.6 kW |
| Water heater | 42 kBtu/hr, 600 W, 60 Gallon | Gas consumption rate = 1.187 m³/hr Electricity consumption = 0.6 kW |
| Lighting | 0.15 kW | 0.15 kW |
| Stove | 4.6 kW | Avg. power during cycle = 1.5 kW |
| Dishwasher | 1.25 kW | Avg. power during cycle = 0.7 kW |
| Cloth washer | 2 kW | Avg. power during cycle = 0.45 kW |
| Dryer | 5 kW | Avg. power during cycle = 1.11 kW |
| Pool pump | 0.75 kW | 0.75 kW |

TABLE 1-continued

| Device | Name plate rating | Average power used |
|---|---|---|
| Energy storage device | 3 kW solar PV panel, battery storage level 30 kWh-6 kWh | 3 kW solar PV panel, battery storage level 6 kWh-30 kWh |

Figure 9:
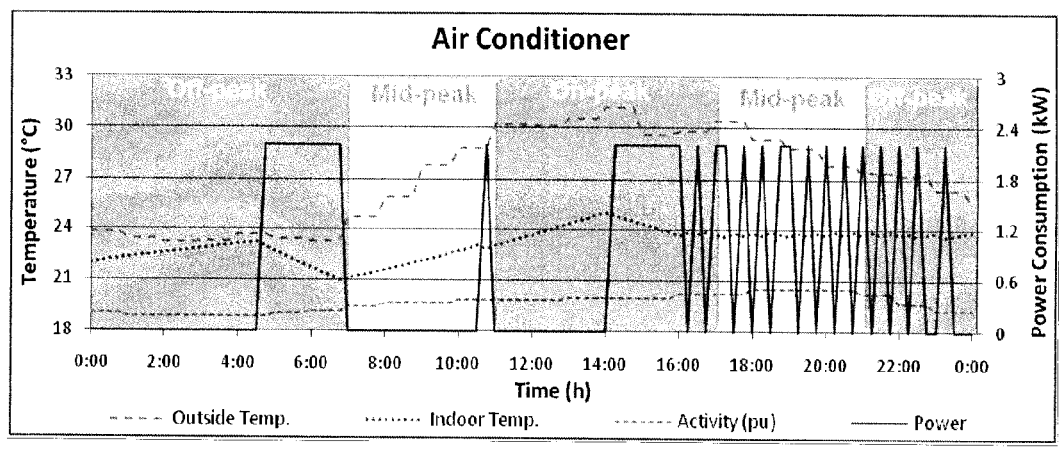
FIG. 9 shows an illustrative operational schedule of the air conditioner in Case 1.

The operational schedules of various devices generated in Case-1 for a typical summer day are presented and discussed for TOU pricing. Thus, FIG. 9 shows the operational schedule of the AC. Power consumption at each time interval, indoor temperature, activity level, and outdoor temperature are shown in this figure.

Figure 10:
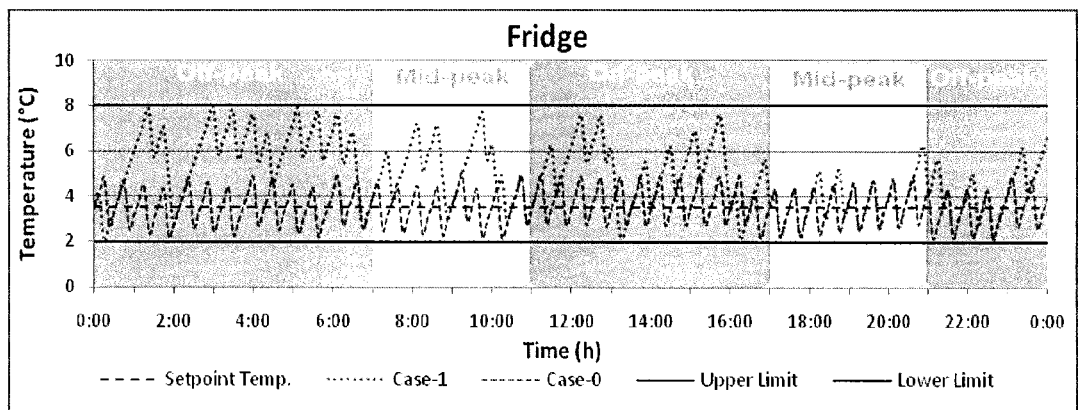
FIG. 10 shows an illustrative comparison of inside fridge temperature in Case 1 and Case 0.

Inside fridge temperatures obtained from the model in Case-1 and Case-0 are shown in FIG. 10. In Case-0, the temperature tracks the user defined set point (3.5° C.), while in Case-1, the temperature varies within the user defined upper and lower limits.

Figure 14:
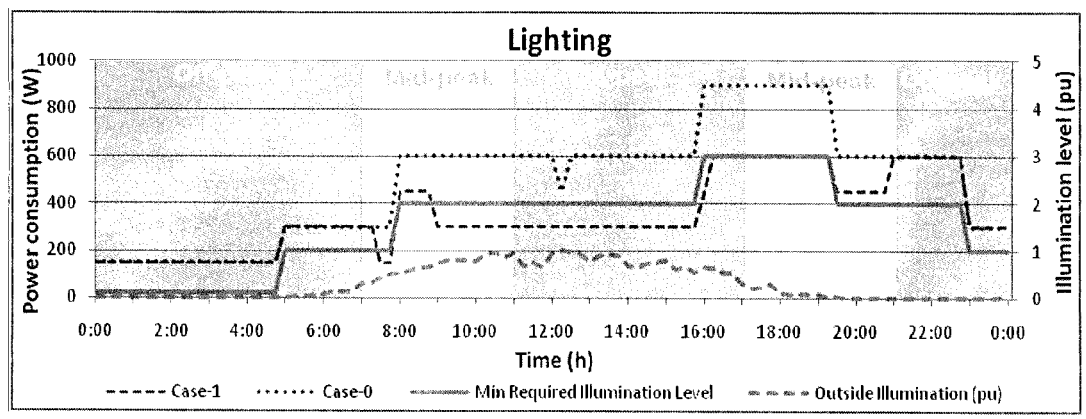
FIG. 14 shows an illustrative comparison of power consumption of lighting in Case 1 and Case 0.
Figure 15:
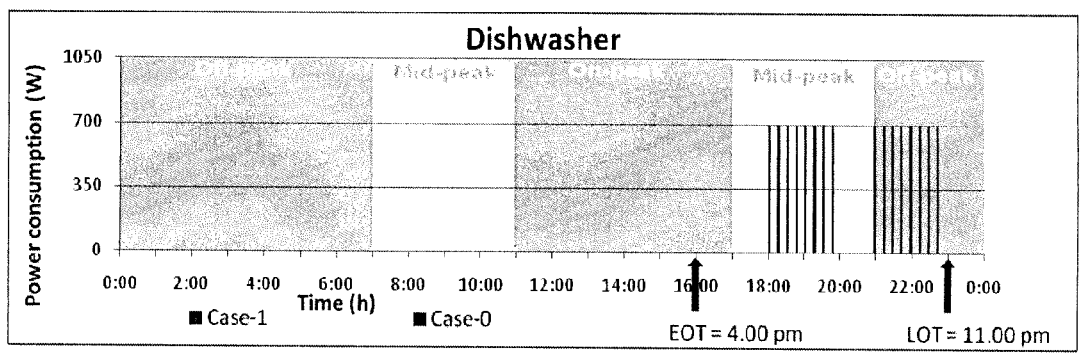
FIG. 15 shows an illustrative comparison of operational schedule of dishwasher in Case 1 and Case 0.

Comparisons of the non-optimal and optimal operational schedules of Case-0 and Case-1 for lighting and the dishwasher are shown in FIGS. 14 and 15, respectively.

In Case-1, the energy optimization engine minimizes the total costs of energy from all devices and maximizes the revenue from energy production/storage devices operation. Table 2, further below, presents a summary of the results in Case-1, compared with respect to the results of Case-0.

These results show that in Case-1 the total energy costs, total energy consumption, and total emissions are respectively reduced by 20.9%, 14.7%, and 21.6%, as compared to Case-0. AC has a major effect on these reductions. The stove, dishwasher, washer, and dryer show no reduction in energy consumption; however, their energy costs are reduced due to the differences in their operational schedules. In general, the individual energy costs of all devices are reduced in Case-1 as compared to Case-0. Peak demand of the household in Case-1 is more than in Case-0.

TABLE 2

| | | Case-0 | | | | |
|---|---|---|---|---|---|---|
| Item | Case-1 | Programmable Thermostat | Change (%) | | Fixed Temperature | Change (%) |
| Energy Cost in $ | 5.03 | 6.24 | 19.3 | | 6.37 | 20.9 |
| Energy Consumption in kWh | 49.96 | 56.91 | 12.2 | | 58.56 | 14.7 |
| Gas Cost in $ | 1.35 | 1.44 | 6.0 | | 1.44 | 60 |
| Gas Consumption in cu · m | 4.60 | 4.90 | 6.1 | | 4.90 | 6.1 |
| ESD Revenue in $ | 19.85 | 16.84 | | | 16.84 | |
| ESD Energy Supply in kWh | 24.75 | 21.00 | | | 21.00 | |
| Emission Cost in $ | 0.40 | 0.50 | | | 0.51 | |
| Emission in kg | 3.98 | 4.96 | 19.8 | | 5.07 | 21.6 |
| Peak Demand in kW | 7.45 | 7.10 | | | 6.05 | |

| Device | Energy Consumption (kWh) | Energy Cost ($) | Energy Consumption (kWh) | Energy Cost ($) | Energy Consumption Change (%) | Energy Cost Change (%) | Energy Consumption (kWh) | Energy Cost ($) | Energy Consumption Change (%) | Energy Cost Change (%) |
|---|---|---|---|---|---|---|---|---|---|---|
| Furnace Electricity | 0 | 0 | 0 | 0 | | | 0 | 0 | | |
| (75 kBtu/hr) Gas in cu · m | 0 | 0 | 0 | 0 | | | 0 | 0 | | |
| Air Conditioner (2.2 kW) | 18.15 | 1.86 | 20.90 | 2.28 | 13.2 | 18.6 | 22.55 | 2.45 | 19.5 | 24.1 |
| Waterheater Electricity | 2.30 | 0.23 | 2.45 | 0.26 | 6.1 | 9.1 | 2.45 | 0.26 | 6.1 | 9.1 |
| (42 kBtu/hr) Gas in cu · m | 4.60 | 1.35 | 4.90 | 1.44 | 6.0 | 6.1 | 4.90 | 1.44 | 6.0 | 6.1 |
| Fridge (0.6 kW) | 3.45 | 0.35 | 3.53 | 0.36 | 2.1 | 2.6 | 3.53 | 0.36 | 2.1 | 2.6 |
| Lighting (0.15 kW) | 8.44 | 0.88 | 12.04 | 1.32 | 29.9 | 32.9 | 12.04 | 1.32 | 29.9 | 32.9 |
| Stove (1.5 kW) | 4.50 | 0.46 | 4.50 | 0.50 | 0.0 | 7.4 | 4.50 | 0.49 | 0.0 | 6.5 |
| Dishwasher (0.7 kW) | 1.40 | 0.11 | 1.40 | 0.16 | 0.0 | 31.6 | 1.40 | 0.16 | 0.0 | 31.6 |
| Washer (0.45 kW) | 0.90 | 0.10 | 0.90 | 0.10 | 0.0 | 0.0 | 0.90 | 0.10 | 0.0 | 0.0 |
| Dryer (1.1 kW) | 2.20 | 0.17 | 2.20 | 0.18 | 0.0 | 5.5 | 2.20 | 0.18 | 0.0 | 5.5 |
| TubWaterheater (1.5 kW) | 1.13 | 0.09 | 1.50 | 0.17 | 25.0 | 48.7 | 1.50 | 0.15 | 25.0 | 42.9 |
| Poolpump (0.75 kW) | 7.50 | 0.78 | 7.50 | 0.91 | 0.0 | 14.9 | 7.50 | 0.90 | 0.0 | 13.2 |

Figure 11:
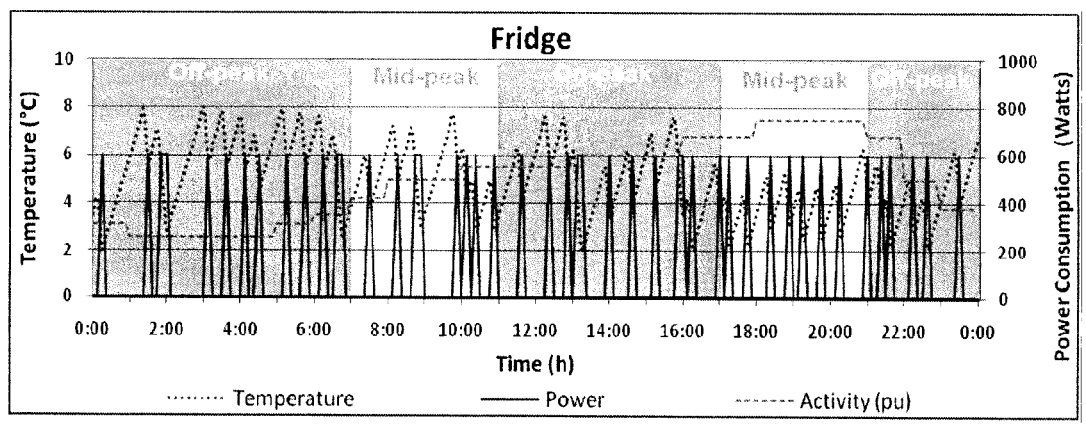
FIG. 11 shows an illustrative operational schedule of fridge.

FIG. 11 depicts the operational schedule and inside temperature generated by the optimization model for the fridge in Case-1. It can be observed that when the activity level increases during the evening hours, the fridge needs to operate more often to keep the inside temperature within the user defined ranges.

Figure 12:
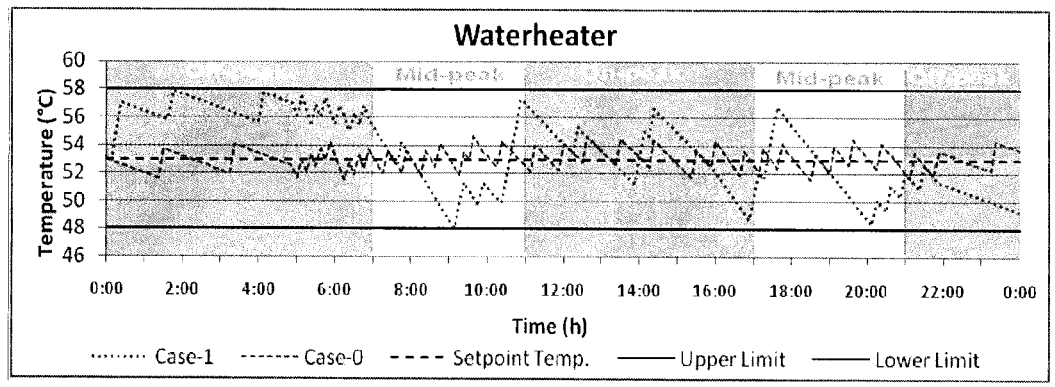
FIG. 12 shows an illustrative comparison of water temperature in Case 1 and Case 0.
Figure 13:
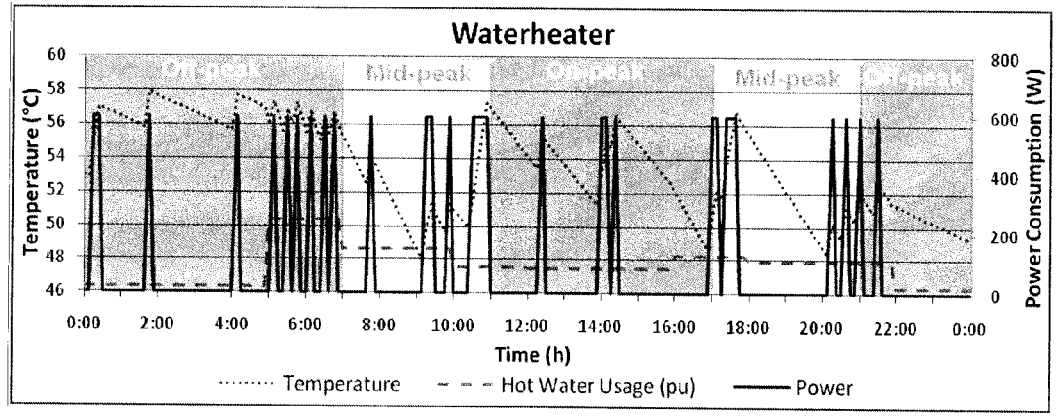
FIG. 13 shows an illustrative operational schedule of water heater.

A comparison of the water heater set points and hot water temperatures for non-optimal Case-0 and optimal Case-1 is depicted in FIG. 12. The optimal operational schedule and hot water demand of the water heater for Case 1 are shown in FIG. 13.

In Case-2, the energy optimization engine minimizes energy consumption of all energy consuming devices and maximizes the operation hours of energy production/storage devices. Table 3, below, presents a summary comparison of Case-2 versus Case-0.

The results show that in Case-2 the total energy consumption, total energy costs, and emissions are respectively reduced by 15.6%, 14.2%, and 15.9%, as compared to Case-0. Observe that the peak demand in Case-2 is less than in Case-0. There is no change in energy consumption of the stove, dishwasher, washer, and dryer, but their energy costs are increased, because the objective function is to minimize total energy consumption, and hence energy costs have no effect on the optimal schedule.

TABLE 3

| | | Case-0 | | | |
|---|---|---|---|---|---|
| Item | Case-2 | Programmable Thermostat | Change (%) | Fixed Temperature | Change (%) |
| Energy Cost in $ | 5.46 | 6.24 | 12.5 | 6.37 | 14.2 |
| Energy Consumption in kWh | 49.41 | 56.91 | 13.2 | 58.56 | 15.6 |
| Gas Cost in $ | 1.35 | 1.44 | 6.0 | 1.44 | 6.0 |
| Gas Consumption in cu · m | 4.60 | 4.90 | 6.0 | 4.90 | 6.0 |
| ESD Revenue in $ | 19.85 | 16.84 | | 16.84 | |
| ESD Energy Supply in kWh | 24.75 | 21.00 | | 21.00 | |
| Emission Cost in $ | 0.43 | 0.50 | | 0.51 | |
| Emission in kg | 4.27 | 4.96 | 13.9 | 5.07 | 15.9 |
| Peak Demand in kW | 6.05 | 7.10 | | 6.05 | |

| Device | Energy Consumption (kWh) | Energy Cost ($) | Energy Consumption (kWh) | Energy Cost ($) | Energy Consumption Change (%) | Energy Cost Change (%) | Energy Consumption (kWh) | Energy Cost ($) | Energy Consumption Change (%) | Energy Cost Change (%) |
|---|---|---|---|---|---|---|---|---|---|---|
| Furnace    Electricity | 0 | | 0 | | | | 0 | | | |
| (75 kBtu/hr)    Gas in cu · m | 0 | | 0 | | | | 0 | | | |
| Air Conditioner (2.2 kW) | 17.60 | 2.07 | 20.90 | 2.28 | 15.8 | 9.0 | 22.55 | 2.45 | 22.0 | 15.2 |
| Waterheater    Electricity | 2.30 | 0.24 | 2.45 | 0.26 | 6.1 | 5.9 | 2.45 | 0.26 | 6.1 | 5.9 |
| (42 kBtu/hr)    Gas in cu · m | 4.60 | 1.35 | 4.90 | 1.44 | 6.0 | 6.1 | 4.90 | 1.44 | 6.0 | 6.1 |
| Fridge (0.6 kW) | 3.45 | 0.36 | 3.53 | 0.36 | 2.1 | 1.6 | 3.53 | 0.36 | 2.1 | 1.6 |
| Lighting (0.15 kW) | 8.44 | 0.88 | 12.04 | 1.32 | 29.9 | 32.9 | 12.04 | 1.32 | 29.9 | 32.9 |
| Stove (1.5 kW) | 4.50 | 0.51 | 4.50 | 0.50 | 0.0 | −2.0 | 4.50 | 0.49 | 0.0 | −3.0 |
| Dishwasher (0.7 kW) | 1.40 | 0.17 | 1.40 | 0.16 | 0.0 | −5.7 | 1.40 | 0.16 | 0.0 | −5.7 |
| Washer (0.45 kW) | 0.90 | 0.11 | 0.90 | 0.10 | 0.0 | −5.7 | 0.90 | 0.10 | 0.0 | −5.7 |
| Dryer (1.1 kW) | 2.20 | 0.25 | 2.20 | 0.18 | 0.0 | −38.2 | 2.20 | 0.18 | 0.0 | −38.2 |
| TubWaterheater (1.5 kW) | 1.13 | 0.09 | 1.50 | 0.17 | 25.0 | 48.7 | 1.50 | 0.15 | 25.0 | 42.9 |
| Poolpump (0.75 kW) | 7.50 | 0.78 | 7.50 | 0.91 | 0.0 | 14.4 | 7.50 | 0.90 | 0.0 | 12.7 |

TABLE 4

| Item | Case-3 | Case-0 Programmable Thermostat |
|---|---|---|
| Energy Cost in $ | 5.05 | 6.24 |
| Energy Consumption in kWh | 49.96 | 56.91 |
| Gas Cost in $ | 1.35 | 1.44 |
| Gas Consumption in cu · m | 4.60 | 4.90 |
| Emission Cost in $ | 0.38 | 0.50 |
| Emission in kg | 3.80 | 4.96 |
| ESD Revenue in $ | 19.85 | 16.84 |
| ESD Energy Supply in kWh | 24.75 | 21.00 |
| ESD Emission Savings in kg | 2.60 | 2.15 |
| Peak Demand in kW | 7.15 | 7.10 |

| Device | Emissions (kg) | Energy Consumption (kWh) | Energy Cost ($) | Emissions (kg) | Energy Consumption (kWh) | Energy Cost ($) |
|---|---|---|---|---|---|---|
| Furnace    Electricity | 0 | 0 | | 0 | 0 | |
| (75 kBtu/hr)    Gas in cu · m | | 0 | | | 0 | |
| Air Conditioner (2.2 kW) | 1.38 | 18.15 | 1.86 | 1.77 | 20.90 | 2.28 |
| Waterheater    Electricity | 0.18 | 2.30 | 0.24 | 0.21 | 2.45 | 0.26 |
| (42 kBtu/hr)    Gas in cu · m | | 4.60 | 1.35 | | 4.90 | 1.44 |
| Fridge (0.6 kW) | 0.27 | 3.45 | 0.35 | 0.28 | 3.53 | 0.36 |
| Lighting (0.15 kW) | 0.69 | 8.44 | 0.88 | 1.05 | 12.04 | 1.32 |
| Stove (1.5 kW) | 0.34 | 4.50 | 0.46 | 0.40 | 4.50 | 0.50 |
| Dishwasher (0.7 kW) | 0.08 | 1.40 | 0.11 | 0.13 | 1.40 | 0.16 |
| Washer (0.45 kW) | 0.08 | 0.90 | 0.10 | 0.08 | 0.90 | 0.10 |
| Dryer (1.1 kW) | 0.12 | 2.20 | 0.17 | 0.13 | 2.20 | 0.18 |
| TubWaterheater (1.5 kW) | 0.04 | 1.13 | 0.09 | 0.15 | 1.50 | 0.17 |
| Poolpump (0.75 kW) | 0.62 | 7.50 | 0.78 | 0.76 | 7.50 | 0.91 |

| | Case-0 | |
|---|---|---|
| Item | Change (%) | Fixed Temperature |
| Energy Cost in $ | 19.1 | 6.37 |
| Energy Consumption in kWh | 12.2 | 58.56 |
| Gas Cost in $ | 6.0 | 1.44 |
| Gas Consumption in cu · m | 6.0 | 4.90 |
| Emission Cost in $ | 23.3 | 0.51 |

TABLE 4-continued

| | | |
|---|---|---|
| Emission in kg | 23.3 | 5.07 |
| ESD Revenue in $ | 16.84 | |
| ESD Energy Supply in kWh | 21.00 | |
| ESD Emission Savings in kg | 2.08 | |
| Peak Demand in kW | 6.05 | |

| Device | Emission Change (%) | Energy Consumption Change (%) | Energy Cost Change (%) | Emissions (kg) | Energy Consumption (kWh) | Energy Cost ($) |
|---|---|---|---|---|---|---|
| Furnace   Electricity | | | | 0 | 0 | |
| (75 kBtu/hr)  Gas in cu · m | | | | 0 | 0 | |
| Air Conditioner (2.2 kW) | 21.8 | 13.2 | 18.2 | 1.92 | 22.55 | 2.45 |
| Waterheater   Electricity | 1.57 | 6.1 | 8.0 | 0.21 | 2.45 | 0.26 |
| (42 kBtu/hr)  Gas in cu · m | | 6.0 | 6.1 | | 4.90 | 1.44 |
| Fridge (0.6 kW) | 3.9 | 2.1 | 2.4 | 0.28 | 3.53 | 0.36 |
| Lighting (0.15 kW) | 34.3 | 29.9 | 32.9 | 1.05 | 12.04 | 1.32 |
| Stove (1.5 kW) | 14.5 | 0.0 | 7.4 | 0.40 | 4.50 | 0.49 |
| Dishwasher (0.7 kW) | 39.5 | 0.0 | 31.6 | 0.13 | 1.4 | 0.16 |
| Washer (0.45 kW) | 1.1 | 0.0 | 0.0 | 0.08 | 0.90 | 0.10 |
| Dryer (1.1 kW) | 5.3 | 0.0 | 5.5 | 0.13 | 2.20 | 0.18 |
| TubWaterheater (1.5 kW) | 71.4 | 25.0 | 48.7 | 0.13 | 1.50 | 0.15 |
| Poolpump (0.75 kW) | 19.2 | 0.0 | 14.7 | 0.75 | 7.50 | 0.90 |

| Item | Case-0 Change (%) |
|---|---|
| Energy Cost in $ | 20.7 |
| Energy Consumption in kWh | 14.7 |
| Gas Cost in $ | 6.0 |
| Gas Consumption in cu · m | 6.0 |
| Emission Cost in $ | 25.0 |
| Emission in kg | 25.0 |
| ESD Revenue in $ | |
| ESD Energy Supply in kWh | |
| ESD Emission Savings in kg | |
| Peak Demand in kW | |

| Device | Emission Change (%) | Energy Consumption Change (%) | Energy Cost Change (%) |
|---|---|---|---|
| Furnace   Electricity | | | |
| (75 kBtu/hr)  Gas in cu · m | | | |
| Air Conditioner (2.2 kW) | 28.0 | 19.5 | 23.8 |
| Waterheater   Electricity | 13.1 | 6.1 | 8.0 |
| (42 kBtu/hr)  Gas in cu · m | | 6.0 | 6.1 |
| Fridge (0.6 kW) | 4.0 | 2.1 | 2.4 |
| Lighting (0.15 kW) | 34.3 | 29.9 | 32.9 |
| Stove (1.5 kW) | 14.6 | 0.0 | 6.5 |
| Dishwasher (0.7 kW) | 38.9 | 0.0 | 31.6 |
| Washer (0.45 kW) | 1.1 | 0.0 | 0.0 |
| Dryer (1.1 kW) | 5.3 | 0.0 | 5.5 |
| TubWaterheater (1.5 kW) | 66.4 | 25.0 | 42.9 |
| Poolpump (0.75 kW) | 17.5 | 0.0 | 12.9 |

In Case-3, the energy optimization engine minimizes $CO_2$ emissions based on Ontario's emissions profile. The results of Case-3 versus Case-0 are presented in Table 4, above.

Note that operational hours of the energy generation/storage device is maximized to reduce the consumer's contribution to $CO_2$ emissions; hence, a 25% emissions reduction is achieved in Case-3 as compared to Case-0. The total energy costs in Case-3 is less than its value in Case-1; this might not always be true, since the devices in Case-3 are scheduled to operate during low-emissions hours which are not necessarily the same as low-price hours. Notice that the peak demand in Case-3 is higher as compared to Case-0.

In Case-4, the energy optimization engine minimizes the total energy costs with a cap on peak power consumption at each time interval. In this case the operational schedules of all devices are inter-dependent. Table 5, below, presents the results obtained for this case with no peak power cap (which is the same as Case-1), intermediate peak power cap, and the maximum peak power cap that results in a feasible solution.

TABLE 5

Effect of Peak Power Limit - Obj: minimization of Cost (Summer TOU)

| Item | No peak power cap | Intermediate peak power cap | Maximum peak power cap |
|---|---|---|---|
| Energy Cost, $ | $ 5.03 | $ 5.07 | $ 5.32 |
| Energy Consumption, kwh | 49.96 | 49.96 | $50.51 |
| Gas Cost, $ | $ 1.35 | $ 1.35 | $ 1.35 |

TABLE 5-continued

Effect of Peak Power Limit - Obj: minimization of Cost (Summer TOU)

| | | | |
|---|---|---|---|
| Gas Consumption, cu · m | 4.60 | 4.60 | 4.60 |
| ESD Revenue, $ | $19.85 | $19.85 | $19.85 |
| ESD Energy Supply, kWh | 24.75 | 24.75 | 24.75 |
| Peak Demand, kW | 14.90 | 10.70 | 7.10 |

| Device | Energy Consumption (kWh) | Energy Cost ($) | Energy Consumption (kWh) | Energy Cost ($) | Energy Consumption (kWh) | Energy Cost ($) |
|---|---|---|---|---|---|---|
| Furnace    Electricity | 0 | | 0 | | 0 | |
| (CC: 75 kBtu/hr)  Gas | 0 | | 0 | | 0 | |
| Air Conditioner (CC: 2.2 kW) | 18.15 | $1.86 | 18.15 | $1.88 | 18.70 | $1.99 |
| Waterheater    Electricity | 2 | 0 | 2 | 0 | 2 | 0 |
| (CC: 42 kBtu/hr)  Gas (cu · m) | 5 | 1 | 5 | 1 | 5 | 1 |
| Fridge (CC: 0.6 kW) | 3.45 | $0.35 | 3.45 | $0.35 | 3.45 | $0.36 |
| Lighting (0.15 kW) | 8.44 | $0.88 | 8.44 | $0.88 | 8.44 | $0.88 |
| Stove (1.5 kW) | 4.50 | $0.46 | 4.50 | $0.47 | 4.50 | $0.49 |
| Dishwasher (CC: 0.7 kW) | 1.40 | $0.11 | 1.40 | $0.11 | 1.40 | $0.17 |
| Washer (0.45 kW) | 0.90 | $0.10 | 0.90 | $0.10 | 0.90 | $0.10 |
| Dryer (1.1 kW) | 2.20 | $0.17 | 2.20 | $0.17 | 2.20 | $0.18 |
| TubWaterheater (1.5 kW) | 1.13 | $0.09 | 1.13 | $0.09 | 1.13 | $0.09 |
| Poolpump (0.75 kW) | 7.50 | $0.78 | 7.50 | $0.78 | 7.50 | $0.83 |

Notice that the peak demand is reduced significantly without any major increase in total energy costs and energy consumption. FIG. 14 illustrates the effects of peak power constraints on power consumption profile of the household.

In Case 5, the energy optimization engine minimizes the total energy costs, energy consumption, and emissions at the same time. Table 6, below, presents the results of Case-5 with respect to Case-0.

TABLE 6

Obj: Minimization of Cost, Energy and Emission (Summer TOU)

| | | Case-0 | |
|---|---|---|---|
| Item | Case-5 | Programmable Thermostat | Change (%) |
| Energy Cost, $ | $ 5.04 | $ 6.24 | 19.3% |
| Energy Consumption, kWh | 49.96 | 56.91 | 12.2% |
| Gas Cost, $ | $ 1.352 | $ 1.44 | 6.0% |
| Gas Consumption kWh | 4.60 | 4.90 | 6.0% |
| Emissions Cost, $ | $ 0.38 | $ 0.50 | 23.0% |
| Emission, kg | 5.82 | 4.96 | 23.0% |
| ESD Revenue, $ | $19.85 | $16.84 | |
| ESD Energy supply, kWh | 24.75 | 21.0 | |
| Power Demand, kW | 15.49 | 14.20 | |

| Device | Emissions (kg) | Energy Consumption (kWh) | Energy Cost ($) | Emissions (kg) | Energy Consumption (kWh) | Energy Cost ($) | Energy Emission Change (%) | Energy Consumption Change (%) | Cost Change (%) |
|---|---|---|---|---|---|---|---|---|---|
| Furnace    Electricity | 0 | 0 | | 0 | 0 | | | | |
| (CC: 75 kBtu/hr)  Gas | 0 | 0 | | 0 | 0 | | | | |
| Air Conditioner (CC: 2.2 kW) | 1.41 | 18.15 | $1.86 | 1.77 | 20.90 | $2.28 | 20.5 | 13.2 | 18.2 |
| Waterheater    Electricity | 0.18 | 2.30 | $0.23 | 0.21 | 2.45 | $0.26 | 12.9 | 6.1 | 10.1 |
| (CC: 42 kBtu/hr)  Gas (cu · m) | | 4.60 | $1.35 | | 4.90 | $1.44 | | 6.0 | 6.1 |
| Fridge (CC: 0.6 kW) | 0.27 | 3.45 | $0.35 | 0.28 | 3.53 | $0.36 | 3.2 | 2.1 | 2.6 |
| Lighting (0.15 kW) | 0.69 | 8.44 | $0.88 | 1.05 | 12.04 | $1.32 | 34.3 | 29.9 | 32.9 |
| Stove (1.5 kW) | 0.34 | 4.50 | $0.46 | 0.40 | 4.50 | $0.50 | 14.5 | 0.0 | 7.4 |
| Dishwasher (CC: 0.7 kW) | 0.08 | 1.40 | $0.11 | 0.13 | 1.40 | $0.16 | 39.5 | 0.0 | 31.6 |
| Washer (0.45 kW) | 0.08017 | 0.90 | $0.10 | 0.08 | 0.90 | $0.10 | 1.1 | 0.0 | 0.0 |
| Dryer (1.1 kW) | 0.12 | 2.20 | $0.17 | 0.13 | 2.20 | $0.18 | 5.3 | 0.0 | 5.5 |
| TubWaterheater (1.5 kW) | 0.04 | 1.13 | $0.09 | 0.15 | 1.50 | $0.17 | 71.4 | 25.0 | 48.7 |
| Poolpump (0.75 kW) | 0.61 | 7.50 | $0.78 | 0.76 | 7.50 | $0.91 | 20.3 | 0.0 | 14.9 |

| | | Case-0 | |
|---|---|---|---|
| Item | | Fixed Temperature | Change (%) |
| Energy Cost, $ | | $ 6.37 | 20.9% |
| Energy Consumption, kWh | | 58.56 | 14.7% |
| Gas Cost, $ | | $ 1.44 | 6.0% |
| Gas Consumption kWh | | 4.90 | 6.0% |
| Emissions Cost, $ | | $ 0.51 | 24.7% |
| Emission, kg | | 5.07 | 24.7% |
| ESD Revenue, $ | | $16.84 | |

TABLE 6-continued

Obj: Minimization of Cost, Energy and Emission (Summer TOU)

| | ESD Energy supply, kWh | | 21.0 | | | |
|---|---|---|---|---|---|---|
| | Power Demand, kW | | 12.10 | | | |

| Device | | Emissions (kg) | Energy Consumption (kWh) | Energy Cost ($) | Emission Reduction (%) | Energy Consumption Change (%) | Energy Cost Change (%) |
|---|---|---|---|---|---|---|---|
| Furnace | Electricity | 0 | 0 | | | | |
| (CC: 75 kBtu/hr) | Gas | 0 | 0 | | | | |
| Air Conditioner (CC: 2.2 kW) | | 1.92 | 22.55 | $2.45 | 26.8 | 19.5 | 23.8 |
| Waterheater | Electricity | 0.21 | 2.45 | $0.26 | 12.2 | 6.1 | 10.1 |
| (CC: 42 kBtu/hr) | Gas (cu · m) | | 4.90 | $1.44 | | 6.0 | 6.1 |
| Fridge (CC: 0.6 kW) | | 0.28 | 3.53 | $0.36 | 3.2 | 2.1 | 2.6 |
| Lighting (0.15 kW) | | 1.05 | 12.04 | $1.32 | 34.3 | 29.9 | 32.9 |
| Stove (1.5 kW) | | 0.40 | 4.50 | $0.49 | 14.6 | 0.0 | 6.5 |
| Dishwasher (CC: 0.7 kW) | | 0.13 | 1.40 | $0.16 | 38.9 | 0.0 | 31.6 |
| Washer (0.45 kW) | | 0.08 | 0.90 | $0.10 | 1.1 | 0.0 | 0.0 |
| Dryer (1.1 kW) | | 0.13 | 2.20 | $0.18 | 5.3 | 0.0 | 5.5 |
| Tubwaterheater (1.5 kW) | | 0.13 | 1.50 | $0.15 | 66.4 | 25.0 | 42.9 |
| Poolpump (0.75 kW) | | 0.75 | 7.50 | $0.90 | 18.7 | 0.0 | 13.2 |

Observe the reductions in total energy costs, energy consumption and emissions as compared to Case-0. However, expectedly, the total energy costs, energy consumption, and emissions obtained in this case are higher as compared to the corresponding values in Case-1, Case-2, and Case-3, respectively. The peak demand of the household is increased since there is no peak power limit on total power consumption.

A summary comparison of the results for all cases is presented in Table 7, further below. Observe that Case-0 has the highest energy costs, energy consumption and emissions among all cases. In terms of total energy costs, Case-1 and Case-5 have almost the same amount of savings as compared to Case-0. In Case-2, the total emission is the highest among all cases, whereas energy consumption is the least. Case-3 and Case-5 have approximately the same amount of total emissions, which are the lowest emissions among all cases. Case-4 with a maximum feasible peak power constraint shows 50% less peak demand as compared to Case-0, while the total energy costs is also less as compared to Case-0. The revenue obtained from supplying energy to the grid is larger in all cases with respect to Case-0, since the optimization model maximizes revenue from the ESD operation.

TABLE 7

Comparison of Air Cases (Summer TOU)

| Item | Case-0 | Case-1 | Case-2 |
|---|---|---|---|
| Energy Cost $ | $ 6.24 | $ 5.03 | $ 5.46 |
| Energy consumption, kWh | $ 6.91 | 49.96 | 49.41 |
| Gas cost, $ | $ 1.44 | $ 1.35 | $ 1.35 |
| Gas consumption, in cu m | 4.90 | 4.60 | 4.60 |
| ESD Revenue $ | $16.84 | $19.85 | $19.85 |
| ESD Energy Supply, kWh | 21.0 | 24.75 | 24.75 |
| Emissions Cost $ | $ 0.38 | $0.40 | $ 0.42 |
| Emissions, kg | 3.80375 | 3.98 | 4.25 |
| Peak Demand kW | 14.20 | 14.90 | 12.09 |

| Device | | Energy Consumption (kWh) | Energy Cost ($) | Emission (kg) | Energy Consumption (kWh) | Energy Cost ($) | Emission (kg) | Energy Consumption (kWh) | Energy Cost ($) | Emission (kg) |
|---|---|---|---|---|---|---|---|---|---|---|
| Furnace | Electricity | 0 | | | 0 | | | 0 | | |
| (CC: 75 kBtu/hr) | Gas | 0 | | | 0 | | | 0 | | |
| Air Conditioner (CC: 2.2 kW) | | 20.90 | $2.28 | 1.77 | 18.15 | $1.86 | 1.50 | 17.60 | $2.07 | 1.55 |
| Waterheater | Electricity | 2.45 | $0.26 | 0.21 | 2.30 | $0.23 | 0.18 | 2.30 | $0.24 | 0.19 |
| (CC: 42 kBtu/hr) | Gas (cu · m) | 4.30 | $1.44 | | 4.60 | $1.35 | | 4.60 | $1.35 | |
| Fridge (CC: 0.6 kW) | | 3.53 | $0.36 | 0.28 | 3.45 | $0.35 | 0.28 | 3.45 | $0.36 | 0.28 |
| Lighting (0.15 kW) | | 12.04 | $1.32 | 1.05 | 8.44 | $0.88 | 0.69 | 8.44 | $0.88 | 0.69 |
| Stove (1.5 kW) | | 4.50 | $0.50 | 0.40 | 4.50 | $0.46 | 0.36 | 4.50 | $0.51 | 0.40 |
| Dishwasher (CC: 0.7 kW) | | 1.40 | $0.16 | 0.13 | 1.40 | $0.11 | 0.08 | 1.40 | $0.17 | 0.14 |
| washer (0.45 kW) | | 0.50 | $0.10 | 0.08 | 0.90 | $0.10 | 0.08 | 0.90 | $0.11 | 0.09 |
| Dryer (1.1 kW) | | 2.20 | $0.18 | 0.13 | 2.20 | $0.17 | 0.12 | 2.30 | $0.25 | 0.20 |
| TubWaterheater (2.5 kW) | | 1.50 | $0.17 | 0.15 | 1.13 | $0.09 | 0.07 | 1.13 | $0.09 | 0.05 |
| Poolpump (0.75 kW) | | 7.50 | $0.91 | 0.76 | 7.50 | $0.78 | 0.61 | 7.50 | $0.78 | 0.65 |

TABLE 7-continued

Comparison of Air Cases (Summer TOU)

| Item | Case-3 | Case-4 with maximum feasiable peak power constraint | Case-5 |
|---|---|---|---|
| Energy Cost $ | $ 5.05 | $ 5.32 | $ 5.04 |
| Energy consumption, kWh | 49.96 | 50.51 | 49.96 |
| Gas cost, $ | $ 1.35 | $ 1.35 | $ 1.35 |
| Gas consumption, cu m | 4.60 | 4.60 | 4.60 |
| ESD Revenue $ | $19.85 | $19.85 | $19.85 |
| ESD Energy Supply, kWh | 24.75 | 24.75 | 24.8 |
| Emissions Cost $ | $ 0.38 | $ 0.42 | $ 0.38 |
| Emissions, kg | 3.80 | 4.23 | 3.82 |
| Peak Demand kW | 14.30 | 7.10 | 15.49 |

| Device | | Energy Consumption (kWh) | Energy Cost ($) | Emission (kg) | Energy Consumption (kWh) | Energy Cost ($) | Emission (kg) | Energy Consumption (kWh) | Energy Cost ($) | Emission (kg) |
|---|---|---|---|---|---|---|---|---|---|---|
| Furnace | Electricity | 0 | | | 0 | | | 0 | | |
| (CC: 75 kBtu/hr) | Gas | 0 | | | 0 | | | 0 | | |
| Air Conditioner (CC: 2.2 kW) | | 18.15 | $1.86 | 1.38 | 18.70 | $1.99 | 1.75 | 18.15 | $1.86 | 1.41 |
| Waterheater | Electricity | 2.30 | $0.24 | 0.18 | 2.30 | $0.24 | 0.19 | 2.30 | $0.23 | 0.18 |
| (CC: 42 kBtu/hr) | Gas (cu · m) | 4.60 | $1.35 | | 4.60 | $1.35 | | 4.60 | $1.35 | |
| Fridge (CC: 0.6 kW) | | 3.45 | $0.35 | 0.27 | 3.45 | $0.36 | 0.28 | 3.45 | $0.35 | 0.27 |
| Lighting (0.15 kW) | | 8.44 | $0.88 | 0.69 | 8.44 | $0.88 | 0.69 | 8.44 | $0.88 | 0.69 |
| Stove (1.5 kW) | | 4.50 | $0.46 | 0.34 | 4.50 | $0.49 | 0.36 | 4.50 | $0.46 | 0.34 |
| Dishwasher (CC: 0.7 kW) | | 1.4 | $0.11 | 0.08 | 1.40 | $0.17 | 0.08 | 1.40 | $0.11 | 0.08 |
| washer (0.45 kW) | | 0.9 | $0.10 | 0.08 | 0.90 | $0.10 | 0.07 | 0.90 | $0.10 | 0.08 |
| Dryer (1.1 kW) | | 2.2 | $0.17 | 0.12 | 2.20 | $0.18 | 0.12 | 2.20 | $0.17 | 0.12 |
| TubWaterheater (2.5 kW) | | 1.13 | $0.09 | 0.04 | 1.13 | $0.09 | 0.06 | 1.13 | $0.09 | 0.04 |
| Poolpump (0.75 kW) | | 7.50 | $0.78 | 0.62 | 7.50 | $0.83 | 0.61 | 7.50 | $0.78 | 0.61 |

Note in Table 7 that total energy costs in Case-1, Case-3, and Case-5 are very close to each other, and all of them are less than the energy costs in Case-0. Gas consumption in all cases remains almost the same but slightly lower than in Case-0, while electricity consumption is considerably less. Case-3 has the lowest amount of emissions, and it is significantly less as compared to Case-0.

The effects of TOU, RTP, and FRP pricing schemes on the operational schedules of the devices are shown in Table 8, below, for Case-1.

TABLE 8

Comparison of effect of different energy prices in Case-1
Obj: Minimzation of cost (Summer)

| Item | Time Of Use (TOU) | Flat Rate (FR) | Real Time Price (RTP) |
|---|---|---|---|
| Energy Cost, $ | $ 5.03 | $ 4.93 | $ 3.00 |
| Energy Consumption, kWh | 49.96 | 53.56 | 52.59 |
| Gas Cost, $ | $ 1.35 | $ 1.35 | $ 1.35 |
| Gas Consumption, kWh | 4.60 | 4.60 | 4.60 |
| ESD Revenue, $ | $19.85 | $19.85 | $19.85 |
| ESD Energy Supply, kWh | 24.75 | 24.75 | 24.75 |
| Emissions Cost, $ | $ 0.40 | $ 0.47 | $ 0.41 |
| Emissions, kg | 3.98 | 4.69 | 4.11 |
| Peak Demand, kW | 14.90 | 11.30 | 14.90 |

| Device | | Energy Consumption (kWh) | Energy Cost ($) | Emission (kg) | Energy Consumption (kWh) | Energy Cost ($) | Emission (kg) | Energy Consumption (kWh) | Energy Cost ($) | Emission (kg) |
|---|---|---|---|---|---|---|---|---|---|---|
| Furnace | Electricity | 0 | | | 0 | | | 0 | | |
| (CC: 75 kBtu/hr) | Gas | 0 | | | 0 | | | 0 | | |
| Air Conditioner (CC: 2.2 kW) | | 18.15 | 1.86 | 1.50 | 18.15 | 1.67 | 1.68 | 18.15 | 1.00 | 1.40 |
| Waterheater | Electricity | 2.30 | 0.23 | 0.18 | 2.30 | 0.21 | 0.19 | 2.30 | 0.13 | 0.18 |
| (CC: 42 kBtu/hr) | Gas (cu · m) | 4.60 | 1.35 | | 4.60 | 1.35 | | 4.60 | 1.35 | |
| Fridge (CC: 0.6 kW) | | 3.45 | 0.35 | 0.28 | 3.45 | 0.32 | 0.28 | 3.53 | 0.20 | 0.28 |
| Lighting (0.15 kW) | | 8.44 | 0.88 | 0.69 | 12.04 | 1.11 | 1.05 | 10.99 | 0.66 | 0.94 |
| Stove (1.5 kW) | | 4.50 | 0.46 | 0.36 | 4.50 | 0.41 | 0.40 | 4.50 | 0.26 | 0.37 |
| Dishwasher (CC: 0.7 kW) | | 1.40 | 0.11 | 0.08 | 1.40 | 0.13 | 0.13 | 1.40 | 0.08 | 0.08 |
| Washer (0.45 kW) | | 0.90 | 0.10 | 0.08 | 0.90 | 0.08 | 0.09 | 0.90 | 0.05 | 0.08 |
| Dryer (1.1 kW) | | 2.20 | 0.17 | 0.12 | 2.20 | 0.20 | 0.20 | 2.20 | 0.13 | 0.12 |

TABLE 8-continued

Comparison of effect of different energy prices in Case-1
Obj: Minimzation of cost (Summer)

| | | | | | | | | | |
|---|---|---|---|---|---|---|---|---|---|
| TubWaterheater (1.5 kW) | 1.13 | 0.09 | 0.07 | 1.13 | 0.10 | 0.05 | 1.13 | 0.04 | 0.04 |
| Poolpump (0.75 kW) | 7.50 | 0.78 | 0.61 | 7.50 | 0.69 | 0.62 | 7.50 | 0.45 | 0.61 |

The results show that, for TOU, the total energy costs increases, although the energy consumption is lower as compared to RTP and FRP cases. Note that the peak demand of the household is reduced significantly in the case of FRP as compared to TOU and RTP.

Therefore, by choosing appropriate objective functions, the energy optimization engine has the capability of generating an energy model that provides operational schedules of devices to minimize total energy costs, energy consumption and emissions, while taking into account the end-user preferences. Also the developed model can reduce the peak load of the household significantly without major increase in total energy costs, which is of interest to utilities. Finally, it is demonstrated that the developed model can lead to considerable reductions in household emissions.

Thus, in an aspect, there is provided a computer-implemented energy hub management system, comprising: a micro energy hub configured to communicate with two or more energy components at a premises; and an energy optimization engine having an energy component model for each energy component based on each energy component's operating characteristics, the energy optimization engine adapted to receive at least one input from the two or more energy components and an input from an external data source on any external energy utilization restrictions for the micro energy hub; whereby, in response to the at least one input from the two or more energy components and any external energy utilization restrictions on the micro energy hub, the energy optimization engine is adapted to issue one or more control signals to at least one of the energy components at the premises to optimize energy utilization (consumption, generation, storage) based on one or more optimization criteria.

In an embodiment, the computer-implemented energy hub management system further comprises: a macro energy hub embodied in a computing device and adapted to control two or more micro energy hubs, the macro energy hub adapted to aggregate energy management information from the two or more micro energy hubs; and in response to load and capacity information for an energy grid obtained from a central controller, enable dynamic management of energy utilization by each of the micro energy hubs by communicating any external energy utilization restrictions to each micro energy hub.

In another embodiment, the macro energy hub is adapted to calculate a peak load based on the aggregated energy management information from the two or more micro energy hubs, and if necessary to maintain the peak load within available capacity of the energy grid, communicate additional external energy utilization restrictions to each micro energy hub.

In another embodiment, the macro energy hub is adapted to communicate additional external energy utilization restrictions to each micro energy hub based on a rolling schedule.

In another embodiment, the energy hub management system is further adapted to hierarchically optimize the macro energy hub and the two or more micro energy hubs to optimize energy utilization on the energy grid.

In another embodiment, the one or more macro energy hubs are adapted to temporarily override a schedule for operation of energy components established by the micro energy hubs in order to prevent a brown-out or black-out on the energy grid.

In another embodiment, micro energy hub is adapted to access the energy optimization engine remotely via a cloud network.

In another embodiment, the energy components are one or more of energy consuming components, energy generating components, and energy storing components, and the micro energy hub is further adapted to communicate bidirectionally with at least some of the energy components.

In another embodiment, the premises is a residence, a commercial premises, an institutional premises, an industrial premises, or an agricultural premises.

In another embodiment, a plurality of micro energy hubs are grouped for control by a macro energy hub based on an analysis of aggregate energy information for the grouped micro energy hubs.

In another embodiment, each energy component model is based on one or more of measured past behaviour of the operation of the energy component and predicted operational information supplied by a manufacturer or reseller of the energy component.

In another embodiment, the micro energy hub is adapted to receive external and environmental data, including energy market prices and weather forecasts.

In another embodiment, the computer-implemented energy hub management system further comprises: a user interface provided by each micro energy hub and adapted to enable a premises manager to indicate one or more user preferences to generate one or more energy component models.

In another embodiment, the micro energy hub is further adapted to communicate to a macro energy hub via an internet web-based interface.

In another embodiment, the micro energy hub is operatively connected to one or more smart meters for obtaining energy usage information for the premises.

In another embodiment, the energy optimization engine is adapted to optimize energy utilization at each energy micro hub, and to optimize peak load and capacity requirements for an external energy grid.

In another embodiment, the energy optimization engine is adapted to operate the energy components based on an established schedule to optimize energy utilization.

In another aspect, there is provided a computer-implemented method for managing an energy hub, comprising: configuring a micro energy hub to communicate with two or more energy components at a premises; providing an energy optimization engine having an energy component model for each energy component based on each energy component's operating characteristics, the energy optimization engine adapted to receive at least one input from the two or more energy components and an input from an external data source on any external energy utilization restrictions for the micro energy hub; and in response to the at least one input from the two or more energy components and any external energy utilization restrictions on the micro energy hub, issuing one or more control signals from the energy optimization engine to at least one of the energy components at the premises to optimize energy utilization based on one or more optimization criteria.

In an embodiment, the computer-implemented method further comprises: providing a macro energy hub embodied in a computing device and adapted to control two or more micro energy hubs, the macro energy hub adapted to aggregate energy management information from the two or more micro energy hubs; and in response to load and capacity information for an energy grid obtained from a central controller, enabling dynamic management of energy utilization by each of the micro energy hubs by communicating any external energy utilization restrictions to each micro energy hub.

In another embodiment, the computer-implemented method further comprises adapting the macro energy hub to calculate a peak load based on the aggregated energy management information from the two or more micro energy hubs, and if necessary to maintain the peak load within available capacity of the energy grid, communicate additional external energy utilization restrictions to each micro energy hub.

In another embodiment, the computer-implemented method further comprises adapting the macro energy hub to communicate additional external energy utilization restrictions to each micro energy hub based on a rolling schedule.

In another embodiment, the computer-implemented method further comprises hierarchically optimizing the macro energy hub and the two or more micro energy hubs to optimize energy utilization on the energy grid.

In another embodiment, the computer-implemented method further comprises adapting one or more macro energy hubs to temporarily override a schedule for operation of energy components established by the micro energy hubs in order to prevent a brown-out or black-out on the energy grid.

In another embodiment, the computer-implemented method further comprises adapting the micro energy hub to access the energy optimization engine remotely via a cloud network.

In another embodiment, the energy components are one or more of energy consuming components, energy generating components, and energy storing components, and the micro energy hub is further adapted to communicate bidirectionally with at least some of the energy components.

In another embodiment, the premises is a residence, a commercial premises, an institutional premises, an industrial premises, or an agricultural premises.

In another embodiment, the computer-implemented method further comprises grouping a plurality of micro energy hubs for control by a macro energy hub based on an analysis of aggregate energy information for the grouped micro energy hubs.

In another embodiment, each energy component model is based on one or more of measured past behaviour of the operation of the energy component and predicted operational information supplied by a manufacturer or reseller of the energy component.

In another embodiment, the micro energy hub is adapted to receive external and environmental data, including energy market prices and weather forecasts.

In another embodiment, a user interface is provided by each micro energy hub and adapted to enable a premises manager to indicate one or more user preferences to generate one or more energy component models.

In another embodiment, the micro energy hub is further adapted to communicate to a macro energy hub via an Internet web-based interface.

In another embodiment, the micro energy hub is operatively connected to one or more smart meters for obtaining energy usage information for the premises.

In another embodiment, the energy optimization engine is adapted to optimize energy utilization at each energy micro hub, and to optimize peak load and capacity requirements for an external energy grid.

In another embodiment, the energy optimization engine is adapted to operate the energy components based on an established schedule to optimize energy utilization.

While various illustrative embodiments have been described by way of example, it will be appreciated that various changes and modifications may be made without departing from the scope of the invention, which is defined by the following claims.

We claim:

1. A computer-implemented energy hub management system, comprising:
   a micro energy hub configured to communicate with two or more energy components at a premises, the energy components comprising one or more of energy consuming components, one or more of energy generating components, and one or more of energy storing components, at least some of the energy components controllable by the micro energy hub; wherein the micro energy hub is configured to optimize the energy utilization from the customer's point of view;
   an energy optimization engine having an energy component model for each energy component based on each energy component's operating characteristics, the energy optimization engine adapted to receive at least one input from the two or more energy components, user optimization criteria to minimize one or more of cost, consumption, and carbon footprint, and an input from an external data source on any external energy utilization restrictions for the micro energy hub; and
   a macro energy hub embodied in a computing device and adapted to control two or more micro energy hubs, the macro energy hub adapted to aggregate energy management information from the two or more micro energy hubs; wherein the macro energy hub is configured to optimize the energy utilization from a utility point of view;
   wherein, in response to load and capacity information for an energy grid obtained from a central controller, and energy management information aggregated from the two or more micro energy hubs, the macro energy hub is adapted to dynamically manage and enforce specific rules for energy utilization by energy components connected to each micro energy hub by having two or more micro energy hubs issue one or more control signals to at least one of the energy components at the premises to optimize energy consumption, generation and storage; wherein at least one of the specific rules determines whether customer driven or utility driven factors shall govern in particular circumstances, within a particular time period.

2. The computer-implemented energy hub management system of claim 1, wherein the macro energy hub is adapted to calculate a peak load based on the aggregated energy management information from the two or more micro energy hubs, and if necessary to maintain the peak load within available capacity of the energy grid, communicate additional external energy utilization restrictions to each micro energy hub.

3. The computer-implemented energy hub management system of claim 2, wherein the macro energy hub is adapted to communicate additional external energy utilization restrictions to each micro energy hub based on a rolling schedule.

4. The computer-implemented energy hub management system of claim 1, wherein the energy hub management system is further adapted to hierarchically optimize the macro energy hub and the two or more micro energy hubs to optimize energy utilization on the energy grid.

5. The computer-implemented energy hub management system of claim 4, wherein the one or more macro energy hubs are adapted to temporarily override a schedule for operation of energy components established by the micro energy hubs in order to prevent a brown-out or black-out on the energy grid.

6. The computer-implemented energy hub management system of claim 1, wherein the micro energy hub is adapted to access the energy optimization engine remotely via a cloud network.

7. The computer-implemented energy hub management system of claim 1, wherein the premises is a residence, a commercial premises, an institutional premises, an industrial premises, or an agricultural premises.

8. The computer-implemented energy hub management system of claim 7, wherein a plurality of micro energy hubs are grouped for control by a macro energy hub based on an analysis of aggregate energy information for the grouped micro energy hubs.

9. The computer-implemented energy hub management system of claim 1, wherein each energy component model is based on one or more of measured past behaviour of the operation of the energy component and predicted operational information supplied by a manufacturer or reseller of the energy component.

10. The computer-implemented energy hub management system of claim 1, wherein the micro energy hub is adapted to receive external and environmental data, including energy market prices and weather forecasts.

11. The computer-implemented energy hub management system of claim 1, wherein the micro energy hub is further adapted to communicate to a macro energy hub via an internet web-based interface.

12. The computer-implemented energy hub management system of claim 1, wherein the micro energy hub is operatively connected to one or more smart meters for obtaining energy usage information for the premises.

13. The computer-implemented energy hub management system of claim 1, wherein the energy optimization engine is adapted to optimize energy utilization at each micro energy hub, and to optimize peak load and capacity requirements for an external energy grid.

14. The computer-implemented energy hub management system of claim 1, wherein the energy optimization engine is adapted to operate the energy components based on an established schedule to optimize energy utilization.

15. A computer-implemented method for managing an energy hub, comprising:
configuring a micro energy hub to communicate with two or more energy components at a premises, the energy components comprising one or more of energy consuming components, one or more of energy generating components, and one or more of energy storing components, at least some of the energy components controllable by the micro energy hub; wherein the micro energy hub is configured to optimize the energy utilization from the customer's point of view;
providing an energy optimization engine having an energy component model for each energy component based on each energy component's operating characteristics, the energy optimization engine adapted to receive at least one input from the two or more energy components, user optimization criteria to minimize one or more of cost, consumption, and carbon footprint, and an input from an external data source on any external energy utilization restrictions for the micro energy hub;
providing a macro energy hub embodied in a computing device and adapted to control two or more micro energy hubs, the macro energy hub adapted to aggregate energy management information from the two or more micro energy hubs; wherein the macro energy hub is configured to optimize the energy utilization from a utility point of view; and
in response to receiving load and capacity information for an energy grid obtained from a central controller; and energy management information aggregated from the two or more micro energy hubs, adapting the macro energy hub to dynamically manage and enforce specific rules for energy utilization by energy components connected to each micro energy hub by having two or more micro energy hubs issue one or more control signals from the energy optimization engine to at least one of the energy components at the premises to optimize energy consumption, generation and storage; wherein at least one of the specific rules determines whether customer driven or utility driven factors shall govern in particular circumstances, within a particular time period.

16. The computer-implemented method of claim 15, further comprising adapting the macro energy hub to calculate a peak load based on the aggregated energy management information from the two or more micro energy hubs, and if necessary to maintain the peak load within available capacity of the energy grid, communicate additional external energy utilization restrictions to each micro energy hub.

17. The computer-implemented method of claim 16, further comprising adapting the macro energy hub to communicate additional external energy utilization restrictions to each micro energy hub based on a rolling schedule.

18. The computer-implemented method of claim 15, further comprising hierarchically optimizing the macro energy hub and the two or more micro energy hubs to optimize energy utilization on the energy grid.

19. The computer-implemented method of claim 18, further comprising adapting one or more macro energy hubs to temporarily override a schedule for operation of energy components established by the micro energy hubs in order to prevent a brown-out or black-out on the energy grid.

20. The computer-implemented method of claim 15, further comprising adapting the micro energy hub to access the energy optimization engine remotely via a cloud network.

21. The computer-implemented method of claim 15, wherein the premises is a residence, a commercial premises, an institutional premises, an industrial premises, or an agricultural premises.

22. The computer-implemented method of claim 21, further comprising grouping a plurality of micro energy hubs for control by a macro energy hub based on an analysis of aggregate energy information for the grouped micro energy hubs.

23. The computer-implemented method of claim 15, wherein each energy component model is based on one or more of measured past behaviour of the operation of the energy component and predicted operational information supplied by a manufacturer or reseller of the energy component.

24. The computer-implemented method of claim 15, wherein the micro energy hub is adapted to receive external and environmental data, including energy market prices and weather forecasts.

25. The computer-implemented method of claim 15, wherein the micro energy hub is further adapted to communicate to a macro energy hub via an internet web-based interface.

26. The computer-implemented method of claim 15, wherein the micro energy hub is operatively connected to one or more smart meters for obtaining energy usage information for the premises.

27. The computer-implemented method of claim 15, wherein the energy optimization engine is adapted to optimize energy utilization at each energy micro hub, and to optimize peak load and capacity requirements for an external energy grid.

28. The computer-implemented method of claim 15, wherein the energy optimization engine is adapted to operate the energy components based on an established schedule to optimize energy utilization.

\* \* \* \* \*